US012617687B2

(12) United States Patent
Medrano Catalan et al.

(10) Patent No.: US 12,617,687 B2
(45) Date of Patent: May 5, 2026

(54) PROCESS FOR PREPARING ELECTROACTIVE MATERIALS FOR METAL-ION BATTERIES

(71) Applicant: NEXEON LIMITED, Abingdon (GB)

(72) Inventors: Jose Medrano Catalan, Oxford (GB); Markus Andersson, Oxford (GB)

(73) Assignee: NEXEON LIMITED, Abingdon (GB)

( * ) Notice: Subject to any disclaimer, the term of this patent is extended or adjusted under 35 U.S.C. 154(b) by 0 days.

(21) Appl. No.: 19/295,353

(22) Filed: Aug. 8, 2025

(65) Prior Publication Data

US 2025/0361148 A1 Nov. 27, 2025

Related U.S. Application Data

(63) Continuation of application No. 18/855,051, filed as application No. PCT/GB2023/050965 on Apr. 11, 2023, now Pat. No. 12,473,203.

(30) Foreign Application Priority Data

Apr. 8, 2022 (GB) ..................................... 2205193

(51) Int. Cl.
*C01B 32/963* (2017.01)

(52) U.S. Cl.
CPC ........ *C01B 32/963* (2017.08); *C01P 2002/08* (2013.01); *C01P 2004/61* (2013.01); *C01P 2004/62* (2013.01); *C01P 2006/12* (2013.01); *C01P 2006/14* (2013.01); *C01P 2006/16* (2013.01); *C01P 2006/40* (2013.01)

(58) Field of Classification Search
CPC ..... C01B 32/963; C01B 33/027; C01B 32/05; C01B 35/02; C01P 2002/08; C01P 2004/61; C01P 2004/62; C01P 2006/12; C01P 2006/14; C01P 2006/16; C01P 2006/40; C01P 2004/51; Y02E 60/10; C23C 16/045; C23C 16/24; C23C 16/26; C23C 16/52; C23C 16/54; C23C 16/56; H01M 4/0428; H01M 4/386; H01M 4/362; H01M 4/625; H01M 2004/021
See application file for complete search history.

(56) References Cited

U.S. PATENT DOCUMENTS

| | | | | |
|---|---|---|---|---|
| 10,508,335 | B1 * | 12/2019 | Yilmaz | C23C 16/045 |
| 2005/0008880 | A1 * | 1/2005 | Kunze | C23C 18/1204 438/584 |
| 2020/0020935 | A1 * | 1/2020 | Costantino | C01B 32/00 |
| 2022/0074045 | A1 * | 3/2022 | Yilmaz | H01M 4/1395 |
| 2023/0304146 | A1 * | 9/2023 | Timmons | C23C 16/4417 |

FOREIGN PATENT DOCUMENTS

WO WO-2022035879 A1 * 2/2022 ......... C23C 16/4417

OTHER PUBLICATIONS

"U.S. Appl. No. 18/855,051 Preliminary Amendment Filed with Application", 9 pgs.
"U.S. Appl. No. 18/855,051, Notice of Allowance mailed Mar. 5, 2025", 10 pgs.
"United Kingdom Application Serial No. 2407868.5, Intention to Grant dated Jan. 29, 2025". (Jan. 29, 2025), 2 pgs.
"United Kingdom Application Serial No. 2407868.5, Notification of Grant dated Mar. 18, 2025", (Mar. 18, 2025), 2 pgs.

* cited by examiner

*Primary Examiner* — Muhammad S Siddiquee
(74) *Attorney, Agent, or Firm* — Schwegman Lundberg & Woessner, P.A.

(57) ABSTRACT

The invention relates to a process for preparing composite particles, the process comprising contacting the plurality of particles in the reaction zone with a gas comprising at least 25 vol % of a silicon-containing precursor at a temperature effective to cause deposition of silicon in the pores of the porous particles. A controlled temperature differential between the maximum temperature of the internal surfaces of the reaction zone and the simultaneous minimum temperature within the plurality of porous particles is maintained during the contacting step.

25 Claims, 11 Drawing Sheets

PROCESS FOR PREPARING ELECTROACTIVE MATERIALS FOR METAL-ION BATTERIES

PRIORITY APPLICATIONS

This application is a continuation of and claims the benefit of priority of U.S. application Ser. No. 18/855,051, filed Oct. 8, 2024, which is a U.S. National Stage Filing under 35 U.S.C. § 371 from International Application No. PCT/GB2023/050965, filed on Apr. 11, 2023, and published as WO2023/194753 on Oct. 12, 2023, which claims the benefit of priority to British Application No. 2205193.2, filed on Apr. 8, 2022; the benefit of priority of each of which is hereby claimed herein, and which applications and publication are hereby incorporated herein by reference in their entireties.

FIELD OF THE INVENTION

The invention relates to processes and systems for preparing electroactive materials that are suitable for use in metal-ion batteries, using chemical vapour infiltration (CVI) to deposit silicon in the pores of porous particulate material.

BACKGROUND

The present inventors have previously reported the development of a class of electroactive materials having a composite structure in which nanoscale electroactive materials, such as silicon, are deposited into the pores of a highly porous particulate material, e.g. a porous carbon material.

For example, WO 2020/128495 discloses such particulate materials comprising a plurality of composite particles.

The materials described in WO 2020/128495 have been synthesized using CVI. The porous particles are contacted with silane gas at temperatures of from 400 to 500° C. Low concentrations of silane are used, such as 1.25 vol %. Such prior CVI methods are adequate for laboratory scale production, but are unsuitable for a large-scale manufacture.

For example, use of such low concentrations of a silicon-containing precursor means that the production time of the composite particles is unacceptable for a large-scale.

Furthermore, it has been discovered that the prior processes of depositing silicon in the pores of porous particles using a CVI method result in uncontrolled soiling of the reaction zone. In particular, relatively large flakes of a composite rich in silicon can form on the internal surfaces of the reaction zone.

Such flaking behaviour is detrimental to production as the soiled material can fragment and mix into the particulate material, even after post-production processes such as sieving. This degrades the quality of the particulate material and can cause undesired effects within electrode formulations, such as uneven expansion and loss of contact.

It has also been identified that the formation of silicon flakes on the internal surfaces of the reaction zone is correlated with the formation of composite particles having a high content of coarse silicon, as defined herein. Coarse silicon is understood by the inventors to be one symptom of non-homogenous silicon deposition. Accordingly, soiling of the reaction zone is believed to correlate with poorly controlled silicon deposition into the porous particles.

In large-scale production, the soiling could completely immobilise production. Halting production to remove the soiled material causes unacceptable delays and troublesome procedures for cleaning.

Some CVI methods such as fixed bed, conveyor bed and vibratory fluidised bed methods rely on a high ratio of reactor surface area per mass of porous particles and a low bed thickness to achieve sufficient heat transfer to the porous particles. In addition to the risk of soiling, the scale-up of such methods is restricted. To increase the throughput of technologies reliant on a relatively high ratio of reactor surface area to mass of porous particles would require a proportional increase of reactor surface area.

There is therefore a need to solve the abovementioned problems.

SUMMARY OF INVENTION

In a first aspect, the invention provides a process for preparing composite particles, the process comprising the steps of:

(a) providing a plurality of porous particles in a reaction zone, the reaction zone having internal surfaces; and (b) contacting the plurality of particles in the reaction zone with a gas comprising at least 25 vol % of a silicon-containing precursor at a temperature effective to cause deposition of silicon in the pores of the porous particles;

wherein $\Delta T \leq +90°$ C. is maintained during step (b), wherein $\Delta T$ represents the temperature differential between the maximum temperature of the internal surfaces of the reaction zone and the simultaneous minimum temperature within the plurality of porous particles, wherein a positive value of $\Delta T$ indicates that the maximum temperature of the internal surfaces of the reaction zone is higher than the minimum temperature within the plurality of particles.

In another aspect, the invention provides a system for preparing composite particles, the system comprising:

(a) a reaction zone configured to hold a plurality of porous particles, the reaction zone having:

(i) at least one heat source configured to heat the plurality of porous particles;

(ii) at least one gas inlet for receiving a gas comprising at least 25 vol % of a silicon-containing precursor;

(iii) at least one gas outlet for withdrawing an effluent gas from the reaction zone;

(b) at least one sensor configured to acquire temperature data within the plurality of porous particles;

(c) at least one sensor configured to acquire temperature data of the internal surfaces of the reaction zone; and (d) a processor;

wherein the at least one sensor configured to acquire temperature data within the plurality of porous particles and the at least one sensor configured to acquire temperature data of the internal surfaces of the reaction zone are configured to transmit the respective temperature data to the processor, and the processor is configured to control the heat source such that $\Delta T \leq +90°$ C. is maintained, wherein $\Delta T$ represents the temperature differential between the maximum temperature of the internal surfaces of the reaction zone and the simultaneous minimum temperature within the plurality of porous particles, wherein a positive value of $\Delta T$ indicates that the maximum temperature of the internal surfaces of the reaction zone is higher than the minimum temperature within the plurality of particles. The system may be used to perform the process of the invention.

The process and system of the invention have been developed to achieve simultaneous control of product quality while avoiding undesirable deposition of silicon onto reactor surfaces.

The deposition of silicon in the process of the invention occurs due to thermal decomposition of a silicon-containing precursor at a surface. The relative amount of silicon deposited onto the pore surfaces of the porous particles and onto the internal surfaces of the reaction zone depends on:

(i) the relative surface area of the porous particles and the internal surfaces of the reaction zone; and (ii) the relative temperature of the porous particles and the internal surfaces of the reaction zone; and The porous particles are very high surface area materials and therefore at equal temperature, silicon deposition would be expected to occur almost entirely on the internal surfaces of the porous particles. However, the porous particles, particularly porous carbon particles, have very poor thermal conductivity and therefore large temperature differentials can develop between reactor surfaces that function as a heat source for the reaction and the porous particles. It is believed that this temperature differential explains the formation of silicon flakes on the internal surfaces of the reaction zone. A further consequence of the temperature differential is that it is associated with a large temperature gradient within the mass of porous particles in the reaction zone. Particles adjacent to the internal reactor surfaces become overheated and suffer from uncontrolled deposition of silicon (resulting in the excess coarse silicon formation described herein) whereas particles further away from the internal reactor surface are significantly cooler, so that silicon deposition is minimal or even absent.

The above-mentioned problems increase still further when the loading of the reactor by the porous particles increases, since the particle bed depth increases, thereby increasing the maximum distance between the particles and the internal reactor surfaces that function as a heat source. The problems also increase when the concentration of the silicon precursor in the gas fed to the reactor is increased. Both of these factors are necessary to ensure high throughput in the reaction zone, but both increase the likelihood of reactor soiling and product inhomogeneity.

The process of the invention addresses these problems by controlling the temperature differential between the porous particles and the internal surfaces of the reaction zone such that it is no more than +90° C. It has been found that this is effectively the upper limit at which the relatively higher surface area of the porous particles is the dominant factor in determining the location of silicon deposition. As the reactor loading and/or the surface area of the porous particle starting increase, the balance tips still further in favour of deposition onto the pore surfaces of the porous particles.

According to the invention, a ΔT of ≤+90° C. is maintained during step (b), such that the temperature of the internal surfaces of the reaction zone never exceeds the minimum temperature within the plurality of porous particles by more than 90° C. This may also be expressed as a requirement to maintain the condition:

$$T_{IS} \leq [T_P + 90° \text{ C.}]$$

during contacting of the gas comprising a silicon-containing precursor and the plurality of porous particles, wherein $T_{IS}$ is the maximum temperature of the internal surfaces of the reaction zone, $T_P$ is the simultaneous minimum temperature within the plurality of particles.

ΔT is therefore equivalent to $T_{IS}-T_P$.

Without being bound by theory, when the reaction conditions are controlled in this way, it is believed that the relatively high surface area of the porous particles in comparison to the internal surfaces of the reaction zone leads to preferential deposition within the pores of the porous particles, even when the maximum temperature of the internal surfaces of the reaction zone exceeds the minimum temperature within the plurality of particles by up to 90° C.

Accordingly, maintaining ΔT≤+90° C. is observed to reduce flake formation in the reaction zone.

DETAILED DESCRIPTION

Figure 1:
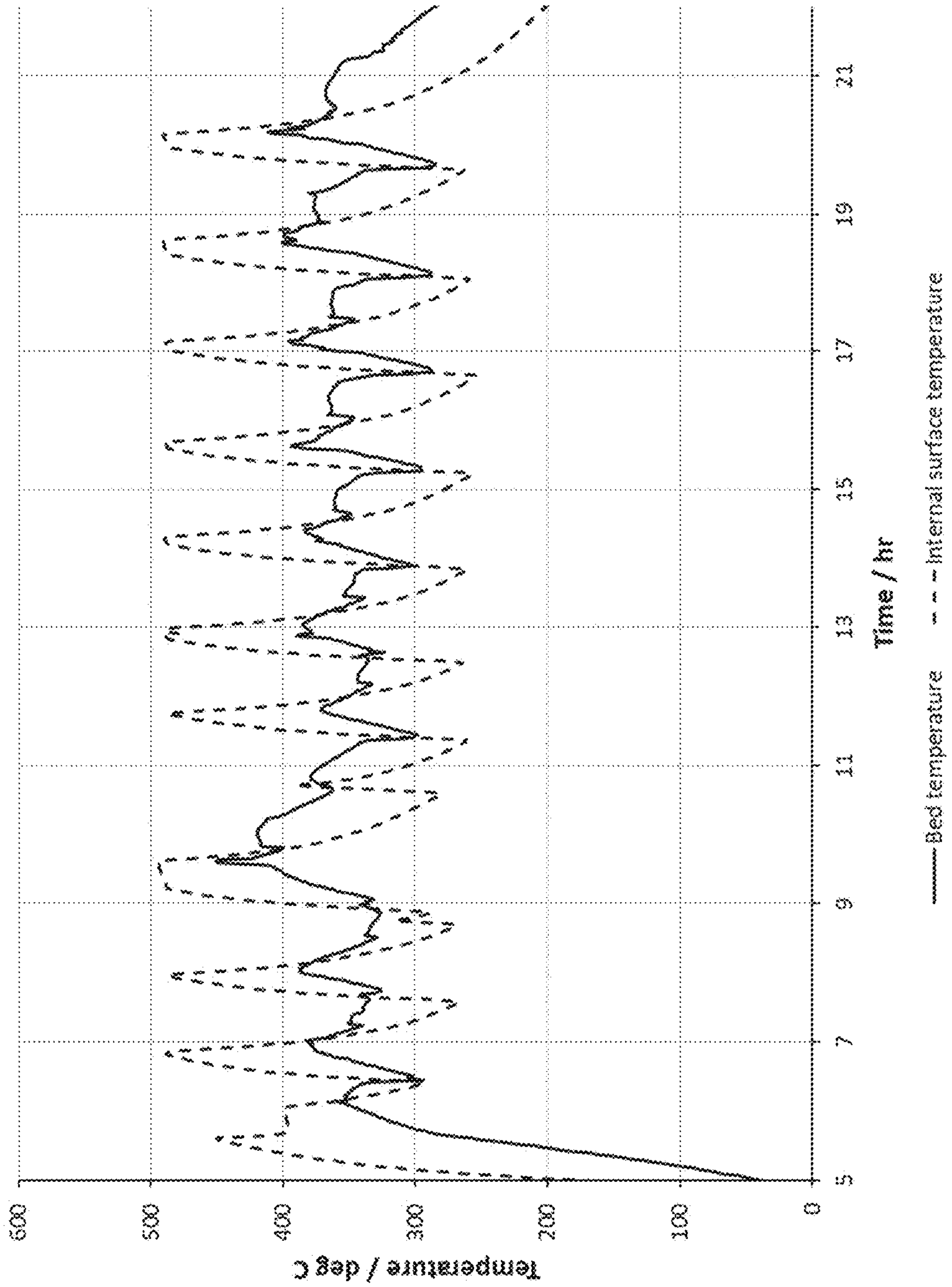
FIG. 1 is a graph showing the representative temperature of the internal surfaces of the reaction zone and the temperature within the plurality of particles of a comparative process.

As used herein, "reaction zone" means a volume that is at least partially enclosed, in which the deposition reaction occurs. The reaction zone may be any suitable form of reactor vessel. The reaction zone may be a batch reactor or a continuous reactor. The reaction zone may be a tubular reactor, a fixed bed reactor, fluidized bed reactor, or a continuous stirred tank reactor.

Preferably, $\Delta T \leq +85°$ C., or $\Delta T \leq +80°$ C., or $\Delta T \leq +75°$ C., or $\Delta T \leq +70°$ C., or $\Delta T \leq +65°$ C., or $\Delta T \leq +60°$ C., or $\Delta T \leq +55°$ C. is maintained during step (b). More preferably, $\Delta T \leq 50°$ C. or $\Delta T \leq 45°$ C., $\Delta T \leq 40°$ C., or $\Delta T \leq 35°$ C., or $\Delta T \leq +30°$ C., or $\Delta T \leq +25°$ C. is maintained during step (b). Still more preferably, $\Delta T \leq +20°$ C., or $\Delta T \leq +15°$ C., or $\Delta T \leq +10°$ C., or $\Delta T \leq +5°$ C. is maintained during step (b). Most preferably, $\Delta T \leq 0°$ C., or $\Delta T \leq -5°$ C., or $\Delta T \leq -10°$ C. is maintained during step (b).

$\Delta T \leq +90°$ C. may be achieved in several ways.

The deposition reaction is exothermic, which increases the temperature of the plurality of particles.

The plurality of porous particles and/or gas comprising the silicon-containing precursor may be preheated. Preheating may contribute to the temperature of the plurality of particles.

The plurality of porous particles and gas comprising the silicon-containing precursor may be contacted, i.e. mixed together, and preheated together. The plurality of porous particles and gas comprising the silicon-containing precursor may be preheated together before providing the plurality of porous particles in the reaction zone. Alternatively, the plurality of porous particles and gas comprising the silicon-containing precursor may be preheated together in the reaction zone.

The plurality of porous particles and/or gas comprising the silicon-containing precursor may be preheated separately.

The plurality of porous particles may be preheated before providing the plurality of porous particles in the reaction zone. For example, the porous particles may be transported through a heating zone before entering the reaction zone. The plurality of porous particles may be preheated to a temperature of from 300 to 480° C., or from 320 to 450° C., or from 330 to 400° C., or from 340 to 390° C., or from 345 to 390° C., or from 350 to 400° C., or from 350 to 390° C., or from 350 to 385° C., or from 350 to 380° C., or from 355 to 390° C., or from 355 to 385° C., or from 355 to 380° C., or from 360 to 390° C., or from 360 to 385° C., or from 360 to 380° C.

The reaction zone may comprise a heat source and step (a) may comprise operating the heat source to heat the plurality of porous particles. The heat source may heat the plurality of porous particles to a temperature of from 340 to 400° C., or from 340 to less than 395° C., or from 340 to 390° C., or from 345 to 400° C., or from 345 to less than 395° C., or from 345 to 390° C., or from 350 to 400° C., or from 350 to less than 395° C., or from 350 to 390° C., or from 350 to 385° C., or from 350 to 380° C., or from 355 to 400° C., or from 355 to less than 395° C., or from 355 to 390° C., or from 355 to 385° C., or from 355 to 380° C., or from 360 to 400° C., or from 360 to less than 395° C., or from 360 to 390° C., or from 360 to 385° C., or from 360 to 380° C., or from 365 to 400° C., or from 365 to less than 395° C., or from 365 to 390° C., or from 365 to 385° C., or from 365 to 380° C., or from 370 to 400° C., or from 370 to less than 395° C., or from 370 to 390° C., or from 370 to 385° C., or from 370 to 380° C. The heat source may be a convection or conduction heat source. A temperature range of from 370 to less than 395° C. is particularly preferred.

The gas comprising the silicon-containing precursor may be preheated before said contacting. Step (b) may comprise preheating the gas to a temperature of from 100 to 350° C. before said contacting, or from 110 to 340° C., or from 120 to 330° C., or from 130 to 320° C., or from 140 to 310° C., or from 150 to 300° C.

Preheating the gas before contacting reduces fluctuations in temperature within the plurality of porous particles that would otherwise be caused by contacting the particles with the gas. In this way, preheating the gas may contribute to maintaining the temperature of the plurality of particles.

Preferably, the $\Delta T$ maintained during step (b) is in the range from +90° C. to −110° C., or from +85° C. to −110° C., or from +80° C. to −110° C., or from +75° C. to −110° C., or from +70° C. to −110° C., or from +65° C. to −110° C., or from +60° C. to −110° C., or from +55° C. to −110° C., or from +50° C. to −110° C., or from +45° C. to −110° C., or from +40° C. to −110° C., or from +35° C. to −110° C., or from +30° C. to −110° C., or from +25° C. to −110° C., or from +20° C. to −110° C., or from +15° C. to −110° C., or from +10° C. to −110° C., or from +5° C. to −110° C., or from 0° C. to −110° C., or from −5° C. to −110° C., or from −5° C. to −105° C., or from −5° C. to −100° C., or from −5° C. to −95° C., or from −5° C. to −90° C., or from −5° C. to −85° C., or from −5° C. to −80° C., or from −5° C. to −75° C., or from −5° C. to −70° C., or from −5° C. to −65° C., or from −5° C. to −60° C., or from −5° C. to −55° C., or from −5° C. to −50° C., or from −5° C. to −45° C., or from −5° C. to −40° C., or from −5° C. to −35° C., or from −5° C. to −30° C., or from −5° C. to −25° C., or from −5° C. to −20° C., or from −5° C. to −15° C., or from −5° C. to −10° C.

In some cases, sufficient silicon may be deposited in the pores of the porous particles in one cycle of deposition. In other cases, it may be desirable to operate the process as a multi-cycle deposition, in which successive deposition steps are used to deposit the target amount of silicon. In said multi-cycle deposition, the process may comprise:

(c) discontinuing deposition of the silicon to form intermediate particles, and optionally separating by-products from the intermediate particles; and (d) contacting the intermediate particles from step (c) with a gas comprising a silicon-containing precursor in a reaction zone, at a temperature effective to cause further deposition of the silicon in the pores of the intermediate particles;

wherein in $\Delta T \leq +90°$ C. is maintained during step (d), wherein $\Delta T$ represents the temperature differential between the maximum temperature of the internal surfaces of the reaction zone and the minimum temperature within the plurality of porous particles, wherein a positive value of $\Delta T$ indicates that the maximum temperature of the internal surfaces of the reaction zone is higher than the minimum temperature within the plurality of particles.

The reaction zone in step (d) may be the same reaction zone as in step (b). Alternatively, steps (b) and (d) may be carried out in different reaction zones.

Steps (c) and (d) may each be repeated as many times as necessary to deposit the target amount of silicon. For example, steps (c) and (d) may each be carried out from 2 to 15 times, giving a total of from 3 to 16 silicon depositions steps including step (b) and the repetitions of step (d). When steps (c) and (d) are repeated, each instance of step (c) and (d) is independently as described herein. For instance, the silicon-containing precursor used in each repetition of step (d) may be the same or different. Preferably, the silicon-containing precursor used in each repetition of step (d) is silane.

Discontinuing deposition in step (c) may be achieved in several ways. Discontinuing deposition may be achieved by allowing the silicon-containing precursor to be consumed completely by the deposition reaction. Alternatively, deposition may be discontinued whilst unreacted silicon-containing precursor remains, such as by reducing the temperature. In this case, the gas comprising a silicon-containing precursor used in step (d) may comprise silicon-containing precursor that is not consumed in step (b).

Preferably, ΔT≤+85° C., or ΔT≤+80° C., or ΔT≤+75° C., or ΔT≤+70° C., or ΔT≤+65° C., or ΔT≤+60° C., or ΔT≤+55° C. is maintained during step (d). More preferably, ΔT≤+50° C., or ΔT≤+45° C., or ΔT≤+40° C., or ΔT≤+35° C., or ΔT≤+30° C., or ΔT≤+25° C. is maintained during step (d). Still more preferably, ΔT≤+20° C., or ΔT≤+15° C., or ΔT≤+10° C., or ΔT≤+5° C. is maintained during step (d). Most preferably, ΔT≤0° C., or ΔT≤−5° C., or ΔT≤−10° C. is maintained during step (d).

During steps (b) and/or (d) the minimum temperature within the plurality of porous particles may be maintained at a temperature within the range from 340 to 400° C., or from 340 to 395° C., or from 340 to 390° C., or from 345 to 400° C., or from 345 to 395° C., or from 345 to 390° C., or from 350 to 400° C., or from 350 to 395° C., or from 350 to 390° C., or from 350 to 385° C., or from 350 to 380° C., or from 355 to 400° C., or from 355 to 395° C., or from 355 to 390° C., or from 355 to 385° C., or from 355 to 380° C., or from 360 to 400° C., or from 360 to 395° C., or from 360 to 390° C., or from 360 to 385° C., or from 360 to 380° C., or from 365 to 400° C., or from 365 to 395° C., or from 365 to 390° C., or from 365 to 385° C., or from 365 to 380° C., or from 370 to 400° C., or from 370 to 395° C., or from 370 to 390° C., or from 370 to 385° C., or from 370 to 380° C. It is particularly preferred that during steps (b), (c) and/or (d) the minimum temperature within the plurality of porous particles is maintained at a temperature of from 370 to less than 395° C.

More preferably, during steps (b) and/or (d), all of the plurality of porous particles is maintained within a temperature range from 340 to 400° C., or from 340 to 395° C., or from 340 to 390° C., or from 345 to 400° C., or from 345 to 395° C., or from 345 to 390° C., or from 350 to 400° C., or from 350 to 395° C., or from 350 to 390° C., or from 350 to 385° C., or from 350 to 380° C., or from 355 to 400° C., or from 355 to 395° C., or from 355 to 390° C., or from 355 to 385° C., or from 355 to 380° C., or from 360 to 400° C., or from 360 to 395° C., or from 360 to 390° C., or from 360 to 385° C., or from 360 to 380° C., or from 365 to 400° C., or from 365 to 395° C., or from 365 to 390° C., or from 365 to 385° C., or from 365 to 380° C., or from 370 to 400° C., or from 370 to 395° C., or from 370 to 390° C., or from 370 to 385° C., or from 370 to 380° C. It is particularly preferred that during steps (b), (c) and/or (d) the minimum temperature within the plurality of porous particles is maintained at a temperature of from 370 to less than 395° C.

Reducing or eliminating fluctuations in temperature of the plurality of porous particles may reduce energy consumption and contribute to improved production efficiency, particularly for large scale systems.

Conventional CVI methods using silane are conducted at temperatures greater than 400° C. Surprisingly, it has been discovered that CVI may be conducted at lower temperatures. Carrying out CVI at such high temperatures (e.g. from 420 to 450° C.) leads to poor infiltration of silicon. Further, use of such high temperatures requires the operation of heating and cooling cycles in the reaction zone, and can exacerbate the uncontrolled soiling of the reaction zone. Overall, these problems limit the production rate. Use of the abovementioned temperatures solves these problems.

The maximum temperature of the internal surfaces of the reaction zone during said contacting in steps (b) and/or (d) may be from 150 to 480° C., or from 150 to 460° C., or from 150 to 440° C., or from 150 to 420° C., or from 150 to 400° C., or from 150 to 390° C., or from 200 to 390° C., or from 250 to 390° C., or from 300 to 390° C., or from 340 to 375° C., or from 340 to 370° C., or from 345 to 370° C., or from 345 to 365° C., or from 350 to 400° C., or from 350 to 390° C., or from 350 to 380° C., or from 350 to 370° C., or from 350 to 365° C.

The maximum temperature of the internal surfaces of the reaction zone during said contacting in steps (b) and/or (d) may be no more than 480° C., or no more than 460° C., or no more than 440° C., or no more than 420° C., or no more than 400° C., or no more than 395° C., or no more than 390° C., or no more than 385° C., or no more than 380° C.

Step (d) may comprise preheating the gas to a temperature of from 100 to 350° C. before said contacting, or from 110 to 340° C., or from 120 to 330° C., or from 130 to 320° C., or from 140 to 310° C., or from 150 to 300° C.

Step (a) may comprise providing a batch of the plurality of porous particles in the reaction zone.

The process may be operated in batch mode. In this case, step (b) or step (d) may comprise discontinuing deposition of the silicon to form the composite particles and withdrawing the composite particles from the reaction zone.

The process may be operated in continuous mode. In this case, step (a) may comprise:

- providing a chemical vapour infiltration unit comprising the reaction zone;
- providing a feedstock comprising the porous particles; and
- continuously introducing the porous particles into the reaction zone;

and step (b) may comprise:

- continuously introducing the gas comprising the silicon-containing precursor into the reaction zone;
- providing conditions in the reaction zone that are effective to cause deposition of silicon in the pores of the porous particles;
- continuously withdrawing composite particles comprising a porous particle framework and elemental silicon within the pores of the porous particle framework from the reaction zone; and
- continuously withdrawing an effluent gas from the reaction zone.

The process may be operated as batch with respect to the porous particles and continuous with respect to the silicon precursor. Step (a) may comprise providing a batch of the plurality of porous particles in the reaction zone. Step (b) may comprise continuously introducing the gas comprising the silicon-containing precursor into the reaction zone.

Step (b) and/or step (d) preferably comprise continuously agitating the porous particles. More preferably step (b) and/or step (d) may comprise mechanically continuously agitating the porous particles during said contacting. Preferably agitating is carried out by a high shear mixer.

Agitation of the porous particles is preferred in the process of the invention since it reduces temperature gradients within the mass of porous particles and promotes homogenous infiltration of the silicon precursor gas throughout the mass of porous particles. Both of these factors contribute to improved homogeneity of silicon deposition throughout the mass of porous particles, thereby reducing both flaking on the surfaces of the reactor and the formation of coarse silicon in the composite particles.

Preferably the reaction zone comprises an agitator for continuously agitating the porous particles during said contacting. Any suitable agitator may be used, such as a turbine agitator, a paddle agitator, an anchor agitator, a propeller agitator, or a helical agitator. It is preferred that the agitator is a high shear mixer.

Mechanically agitating the porous particles decouples the rate of silicon precursor gas supply from the efficiency of mixing of the porous particles. With a vertical fluidised bed reactor, agitation of the porous particles can only be achieved by supplying the silicon precursor gas at a sufficient velocity to fluidise the porous particles. In consequence, the use of mechanical agitation enables the process to function with lower silicon precursor gas velocity than vertical fluidised bed reactor processes and allows the residence time of the silicon precursor to be adjusted independently from agitation.

The use of a high shear mixer provides continuous mechanical agitation and effectively breaks up agglomerates which form naturally due to the cohesive nature of the porous particles. Therefore, both heat and mass transfer challenges are addressed.

The combination of the temperature control of the invention, i.e. maintaining $\Delta T \leq +90°$ C., with continuous agitation minimises the risk of non-homogenous silicon infiltration and spoiling of the reactor.

The plurality of porous particles in the reaction zone in step (a) preferably has a volume of at least 100 $cm^3$ per litre of reaction zone volume ($cm^3/L_{RV}$), or at least 150 $cm^3/L_{RV}$, or at least 200 $cm^3/L_{RV}$, or at least 250 $cm^3/L_{RV}$, or at least 300 $cm^3/L_{RV}$, or at least 400 $cm^3/L_{RV}$, or at least 500 $cm^3/L_{RV}$, or at least 600 $cm^3/L_{RV}$, or at least 700 $cm^3/L_{RV}$, or at least 800 $cm^3/L_{RV}$, or at least 900 $cm^3/L_{RV}$.

Preferably, the plurality of porous particles has a volume of at least 500 $cm^3/L_{RV}$ and in some embodiments is optionally sufficient so as to substantially fill the volume of the reaction zone.

As used herein, the volume of the porous particles refers to the equivalent volume of the porous particles as determined from the mass of particles and the tap density. For example, 200 g of a porous particle material having a tap density of 1000 g/L is taken to be 200 $cm^3$ of the porous particle material.

In the case of a continuous reactor, in which the porous particles are moved through the reaction zone, the equivalent volume of porous particles in the reactor is calculated on the basis of the feed rate of porous particles to the reaction zone in $g \cdot min^{-1}$, the mean residence time of the particles in the reaction zone, and the tap density of the porous particles as set out above.

The ratio of the internal surface area of the reaction zone to mass of porous particles in the reaction zone may be no more than 1 $m^2$/kg, or no more than 0.9 $m^2$/kg, or no more than 0.8 $m^2$/kg, or no more than 0.7 $m^2$/kg, or no more than 0.6 $m^2$/kg, or no more than 0.5 $m^2$/kg, or no more than 0.4 $m^2$/kg, or no more than 0.3 $m^2$/kg, or no more than 0.2 $m^2$/kg, or no more than 0.1 $m^2$/kg.

The ratio of the internal surface area of the reaction zone to mass of porous particles in the reaction zone may be at least 0.001 $m^2$/kg, or at least 0.002 $m^2$/kg, or at least 0.003 $m^2$/kg, or at least 0.004 $m^2$/kg, or at least 0.006 $m^2$/kg, or at least 0.008 $m^2$/kg, or at least 0.01 $m^2$/kg.

For example, the ratio of the internal surface area of the reaction zone to mass of porous particles in the reaction zone may be in the range from 0.001 $m^2$/kg to 1 $m^2$/kg, or 0.002 $m^2$/kg to 0.9 $m^2$/kg, or 0.003 $m^2$/kg to 0.8 $m^2$/kg, or 0.004 $m^2$/kg to 0.7 $m^2$/kg, or 0.006 $m^2$/kg to 0.6 $m^2$/kg, or 0.008 $m^2$/kg to 0.5 $m^2$/kg, or 0.01 $m^2$/kg to 0.4 $m^2$/kg, or 0.01 $m^2$/kg to 0.3 $m^2$/kg.

The bed depth of the porous particles in the reaction zone may be at least 11 cm, or at least 15 cm, or at least 20 cm, or at least 25 cm, or at least 30 cm.

It is preferred to combine the aforementioned porous particle volumes per litre of reaction zone, ratios of the internal surface area of the reaction zone to mass of porous particles in the reaction zone, and/or bed depths of the porous particles in the reaction zone with continuous agitation as described herein.

The plurality of porous particles in the reaction zone in step (a) may have a volume of at least 100 $cm^3/L_{RV}$ and the bed depth of the porous particles in the reaction zone may be at least 11 cm.

The plurality of porous particles in the reaction zone in step (a) may have a volume of at least 200 $cm^3/L_{RV}$ and the bed depth of the porous particles in the reaction zone may be at least 15 cm.

The plurality of porous particles in the reaction zone in step (a) may have a volume of at least 300 $cm^3/L_{RV}$ and the bed depth of the porous particles in the reaction zone may be at least 20 cm.

The plurality of porous particles in the reaction zone in step (a) may have a volume of at least 400 $cm^3/L_{RV}$ and the bed depth of the porous particles in the reaction zone may be at least 25 cm.

The plurality of porous particles in the reaction zone in step (a) may have a volume of at least 500 $cm^3/L_{RV}$ and the bed depth of the porous particles in the reaction zone may be at least 30 cm.

The plurality of porous particles in the reaction zone in step (a) may have a volume of at least 100 $cm^3/L_{RV}$ and the ratio of the internal surface area of the reaction zone to mass of porous particles in the reaction zone may be no more than 1 $m^2$/kg.

The plurality of porous particles in the reaction zone in step (a) may have a volume of at least 200 $cm^3/L_{RV}$ and the ratio of the internal surface area of the reaction zone to mass of porous particles in the reaction zone may be no more than 0.9 $m^2$/kg.

The plurality of porous particles in the reaction zone in step (a) may have a volume of at least 300 $cm^3/L_{RV}$ and the ratio of the internal surface area of the reaction zone to mass of porous particles in the reaction zone may be no more than 0.8 $m^2$/kg.

The plurality of porous particles in the reaction zone in step (a) may have a volume of at least 400 $cm^3/L_{RV}$ and the ratio of the internal surface area of the reaction zone to mass of porous particles in the reaction zone may be no more than 0.7 $m^2$/kg.

The plurality of porous particles in the reaction zone in step (a) may have a volume of at least 500 $cm^3/L_{RV}$ and the ratio of the internal surface area of the reaction zone to mass of porous particles in the reaction zone may be no more than 0.6 $m^2$/kg.

The plurality of porous particles in the reaction zone in step (a) may have a volume of at least 600 $cm^3/L_{RV}$ and the ratio of the internal surface area of the reaction zone to mass of porous particles in the reaction zone may be no more than 0.5 $m^2$/kg.

Suitable precursors of silicon include silane ($SiH_4$), disilane ($Si_2H_6$), trisilane ($Si_3H_8$), tetrasilane ($Si_4H_{10}$), methylsilane ($CH_3SiH_3$), dimethylsilane ($(CH_3)_2SiH_2$), or chlorosilanes such as trichlorosilane ($HSiCl_3$) or methylchlorosilanes such as methyltrichlorosilane ($CH_3SiCl_3$) or dimethyldichlorosilane ($(CH_3)_2SiCl_2$). A preferred precursor of silicon is silane.

The silicon-containing precursor used in steps (b) and (d) may be the same or different. Preferably, the silicon-containing precursor used in each of steps (b) and (d) is silane.

The pressure in step (b) and/or (d) may be from 10 to 10000 kPa, or from 100 to 5000 kPa, or from 100 to 4000 kPa, or from 100 to 3000 kPa, or from 100 to 2000 kPa, or from 100 to 1000 kPa, or from 100 to 500 kPa.

The pressure in step (b) and/or (d) may be from 10 to 15000 kPa, or from 50 to 10000 kPa, or from 120 to 5000 kPa, or from 150 to 2000 kPa, or from 200 to 1800 kPa, or from 200 to 1600 kPa, or from 250 to 1500 kPa, or from 300 to 1200 kPa, or from 400 to 1000 kPa, or from 500 to 900 kPa, or from 600 to 800 kPa.

References to the pressure in any step of the claimed process refer to the absolute pressure in the reaction zone, which may comprise any suitable form of reactor vessel.

The silicon-containing precursors in steps (b) and/or (d) may be used either in pure form (or substantially pure form) or as a diluted mixture with an inert carrier gas, such as nitrogen or argon. The carrier gas may also be hydrogen, which is inert under the conditions of the reaction. When in a diluted mixture with a carrier gas, the silicon-containing precursor in step (b) is used in an amount of at least 25 vol %. The gas may comprise at least 30 vol % of silicon-containing precursor based on the total volume of the gas, or at least 40 vol %, or at least 50 vol %, or at least 60 vol %, or at least 70 vol %, or at least 80 vol %, or at least 90 vol %, or at least 95 vol %, or at least 97 vol %, or at least 99 vol % of silicon-containing precursor based on the total volume of the gas. The vol % of silicon-containing precursor based on the total volume of the gas refers to the concentration of silicon-containing precursor in the gas being supplied to the reaction zone.

When in a diluted mixture with an inert carrier gas, the silicon-containing precursor in step (d) may be used in an amount in the range from preferably 1 to 95 vol %, or 1 to 85 vol %, or 1 to 70 vol %, or 1 to 50 vol %, or 2 to 40 vol %, or 5 to 30 vol %, or from 5 to 25 vol % based on the total gaseous volume of the precursor and an inert carrier gas. The gas used in step (d) may comprise at least 25 vol % of silicon-containing precursor based on the total volume of the gas, or at least 30 vol %, or at least 40 vol %, or at least 50 vol %, or at least 60 vol %, or at least 70 vol %, or at least 80 vol %, or at least 90 vol %, or at least 95 vol %, or at least 97 vol %, or at least 99 vol % of silicon-containing precursor based on the total volume of the gas.

The presence of oxygen should be minimised to prevent undesired oxidation of the deposited silicon, in accordance with conventional procedures for working in an inert atmosphere. Preferably, the oxygen content is less than 0.01 vol %, more preferably less than 0.001 vol % based on the total volume of gas used in steps (b) and (d).

The term "BET surface area" as used herein should be taken to refer to the surface area per unit mass calculated from a measurement of the physical adsorption of gas molecules on a solid surface, using the Brunauer-Emmett-Teller theory, in accordance with ISO 9277.

The porous particles may have a BET surface area in the range from 100 $m^2/g$ to 4,000 $m^2/g$. Preferably, the BET surface of the porous particles is from 500 $m^2/g$ to 4,000 $m^2/g$, or from 750 $m^2/g$ to 3,500 $m^2/g$, or from 1,000 $m^2/g$ to 3,250 $m^2/g$, or from 1,000 $m^2/g$ to 3,000 $m^2/g$, or from 1,000 $m^2/g$ to 2,500 $m^2/g$, or from 1,000 $m^2/g$ to 2,000 $m^2/g$. The high surface area of the porous particles in comparison to the internal surfaces of the reactor leads to a preferential deposition within the pores of the porous particles, particularly at high particle loadings relative to the reactor volume and internal surface area.

The porous particles comprise a three-dimensionally interconnected open pore network. The porous particles may comprise micropores and/or mesopores. Typically, the porous particles include both micropores and mesopores. However, it is not excluded that porous particles may be used which include micropores and no mesopores, or mesopores and no micropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

References herein to the volume of micropores, mesopores and macropores in the porous particles, and also any references to the distribution of pore volume within the porous particles, relate to the internal pore volume of the porous particles used as the starting material in step (a) of the claimed process, i.e. prior to deposition of silicon into the pore volume in step (b).

The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ values are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous particles comprise macropores, the volume of pores having diameter in the range from greater than 50 nm and up to 100 nm may be measured by mercury porosimetry and is preferably no more than 0.3 $cm^3/g$, or no more than 0.2 $cm^3/g$, or no more than 0.1 $cm^3/g$, or no more than 0.05 $cm^3/g$. A small fraction of macropores may be useful to facilitate electrolyte access into the pore network.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension $\gamma$ taken to be 480 mN/m and the contact angle $\varphi$ taken to be 140° for mercury at room temperature. The density of mercury is taken to be 13.5462 $g/cm^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the porous particles. Porosity values specified herein shall be understood as referring to the volume of open pores, i.e. pores that are accessible to a fluid from the exterior of the porous particles. Fully enclosed pores which cannot be identified by nitrogen adsorption or mercury porosimetry shall not be taken into account herein when determining porosity values. Likewise, any pore volume located in pores that are so small as to be below the limit of detection by nitrogen adsorption is not taken into account.

The total pore volume of micropores and mesopores as measured by nitrogen gas adsorption may be in the range from 0.4 to 2.2 $cm^3/g$, or from 0.45 to 2.2 $cm^3/g$, or from 0.5 to 2 $cm^3/g$, or from 0.55 to 2 $cm^3/g$, or from 0.6 to 1.8 $cm^3/g$, or from 0.65 to 1.8 $cm^3/g$, or from 0.7 to 1.6 $cm^3/g$, or from 0.7 to 1.5 $cm^3/g$, or from 0.7 to 1.4 $cm^3/g$. The use of high porosity particles may be advantageous since it allows a larger amount of silicon to be accommodated within the pore volume.

The general term "$PD_n$ pore diameter" refers herein to the volume-based nth percentile pore diameter, based on the total volume of micropores and mesopores.

For instance, the term "$PD_{50}$ pore diameter" as used herein refers to the pore diameter below which 50% of the total micropore and mesopore volume is found.

The $PD_{50}$ pore diameter of the porous particles may be no more than 30 nm, or no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm, or no more than 1.5 nm.

The $PD_{30}$ pore diameter of the porous particles may be no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm, or no more than 1 nm.

The term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments™. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in 2-propanol with a 5 vol % addition of the surfactant SPAN™-40 (sorbitan monopalmitate). The particle refractive index is taken to be 2.68 for porous particles and 3.50 for composite particles and the dispersant index is taken to be 1.378. Particle size distributions are calculated using the Mie scattering model.

In general, the porous particles may have a $D_{50}$ particle diameter in the range from 0.5 to 200 μm. The porous particles may have a $D_{50}$ particle diameter in the range from 0.5 to 30 μm, or from 1 to 25 μm, or from 1 to 20 μm, or from 2 to 25 μm, or from 2 to 20 μm, or from 2 to 18 μm, or from 2 to 15 μm, or from 2 to 12 μm, or from 2.5 to 15 μm, or from 2.5 to 12 μm, or from 2 to 10 μm.

The porous particles function as a framework for the silicon, which is typically deposited in the form of a plurality of silicon domains. As used herein, the term "silicon domain" refers to a body of silicon, e.g. elemental silicon, having maximum dimensions that are determined by the dimensions of the pores (e.g. micropores and/or mesopores) of the porous particles in which they are located. The silicon domains may therefore be described as nanoscale silicon domains, wherein the term "nanoscale" is understood to refer generally to dimensions less than 100 nm.

Although, due to the dimensions of micropores and mesopores, the silicon domains typically have maximum dimensions in any direction of less than 50 nm, and usually significantly less than 50 nm. A domain may for example take the form of a regular or irregular particle or a bounded layer or region of coating.

The porous particles preferably comprise a conductive material. The use of conductive porous particles is advantageous as the porous particles form a conductive framework within the composite particles which facilitates the flow of electrons between lithium atoms/ions inserted into the silicon and a current collector.

A preferred type of conductive porous particles are particles comprising or consisting of a conductive carbon material, referred to herein as conductive porous carbon particles.

The conductive porous carbon particles preferably comprise at least 80 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The porous carbon particles may be either hard carbon particles or soft carbon particles.

As used herein, the term "hard carbon" refers to a disordered carbon matrix in which carbon atoms are found predominantly in the $sp^2$ hybridised state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 $cm^{-1}$) in the Raman spectrum. However, the carbon is not fully graphitic as evidenced by the significant D-band (~1350 $cm^{-1}$) in the Raman spectrum. The graphitic nature of carbon materials can be assessed by monitoring the ratio in peak intensity of the D-band to the G-band (ID/IG). The porous carbon particles may comprise an ID/IG of no more than 0.84.

As used herein, the term "soft carbon" also refers to a disordered carbon matrix in which carbon atoms are found predominantly in the $sp^2$ hybridised state (trigonal bonds) in polyaromatic domains having dimensions in the range from 5 to 200 nm. In contrast to hard carbons, the polyaromatic domains in soft carbons are associated by intermolecular forces but are not cross-linked with a chemical bond. This means that they will graphitise at high temperature. The porous carbon particles preferably comprise at least 50% $sp^2$ hybridised carbon as measured by XPS. For example, the porous carbon particles may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

A variety of different materials may be used to prepare suitable porous carbon particles via pyrolysis. Examples of organic materials that may be used include plant biomass including lignocellulosic materials (such as coconut shells, rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different carbon materials are available in the art depending on the starting material and the conditions of the pyrolysis process. Porous carbon particles of various different specifications are available from commercial suppliers.

Porous carbon particles may undergo a chemical or gaseous activation process to increase the volume of mesopores and micropores. A suitable activation process comprises contacting pyrolyzed carbon with one or more of oxygen, steam, CO, $CO_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

Alternatives to carbon-based conductive particles include porous particles comprising titanium nitride (TiN), titanium carbide (TiC), silicon carbide (SiC), nickel oxide (NiOx), titanium silicon nitride (TiSiN), nickel nitride ($Ni_3N$), molybdenum nitride (MoN), titanium oxynitride ($TiO_xN_{1-x}$), silicon oxycarbide (SiOC), boron nitride (BN), or vanadium nitride (VN). Preferably the porous particles comprise titanium nitride (TiN), silicon oxycarbide (SiOC) or boron nitride (BN).

The total volume of micropores and mesopores in the porous particles may be at least 0.45 $cm^3/g$, or at least 0.5 $cm^3/g$, at least 0.55 $cm^3/g$, or at least 0.6 $cm^3/g$, or at least 0.65 $cm^3/g$, or at least 0.7 $cm^3/g$, or at least 0.75 $cm^3/g$, or at least 0.8 $cm^3/g$, at least 0.85 $cm^3/g$, or at least 0.9 $cm^3/g$, or at least 0.95 $cm^3/g$, or at least 1 $cm^3/g$.

The internal pore volume of the porous particles may be suitably capped at a value at which increasing fragility of the particles structure outweighs the advantage of increased pore volume accommodating a larger amount of electroactive material. Preferably, the total volume of micropores and mesopores in the porous particles is no more than 2 $cm^3/g$, or no more than 1.8 $cm^3/g$, or no more than 1.6 $cm^3/g$, or no more than 1.5 $cm^3/g$, or no more than 1.45 $cm^3/g$, or no more than 1.4 $cm^3/g$, or no more than 1.35 $cm^3/g$, or no more than 1.3 $cm^3/g$, or no more than 1.25 $cm^3/g$, or no more than 1.2 $cm^3/g$, or no more than 1.1, or no more than 1, or no more than 0.95.

Preferably the total volume of micropores and mesopores in the porous particles is in the range from 0.45 to 2.2 $cm^3/g$, or from 0.5 to 2 $cm^3/g$, or from 0.55 to 2 $cm^3/g$, or from 0.6 to 1.8 $cm^3/g$, or from 0.65 to 1.8 $cm^3/g$, or from 0.7 to 1.6 $cm^3/g$, or from 0.7 to 1.5 $cm^3/g$, or from 0.7 to 1.4 $cm^3/g$.

The total volume of micropores and mesopores in the porous particles may also be in the range from 0.55 to 1.4 $cm^3/g$, or from 0.6 to 1.4 $cm^3/g$, or from 0.6 to 1.3 $cm^3/g$, or from 0.65 to 1.3 $cm^3/g$, or from 0.65 to 1.2 $cm^3/g$, or from 0.7 to 1.2 $cm^3/g$, or from 0.7 to 1.1 $cm^3/g$, or from 0.7 to 1 $cm^3/g$, or from 0.75 to 0.95 $cm^3/g$.

The total volume of micropores and mesopores in the porous particles may also be in the range from 0.4 to 0.75 $cm^3/g$, or from 0.4 to 0.7 $cm^3/g$, or from 0.4 to 0.65 $cm^3/g$, 0.45 to 0.75 $cm^3/g$, or from 0.45 to 0.7 $cm^3/g$, or from 0.45 to 0.65 $cm^3/g$, or from 0.45 to 0.6 $cm^3/g$.

The total volume of micropores and mesopores in the porous particles may also be in the range from 0.6 to 2 $cm^3/g$, or from 0.6 to 1.8 $cm^3/g$, or from 0.7 to 1.8 $cm^3/g$, or from 0.7 to 1.6 $cm^3/g$, or from 0.8 to 1.6 $cm^3/g$, or from 0.8 to 1.5 $cm^3/g$, or from 0.8 to 1.4 $cm^3/g$, or from 0.9 to 1.5 $cm^3/g$, or from 0.9 to 1.4 $cm^3/g$, or from 1 to 1.4 $cm^3/g$.

The $PD_{90}$ pore diameter of the porous particles may be no more than 35 nm, or no more than 30 nm, or no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm. Preferably, the $PD_{90}$ pore diameter of the porous particles is at least 2.5 nm, or at least 3 nm, or at least 3.5 nm, or at least 4 nm. For example, the $PD_{90}$ pore diameter of the porous particles is preferably in the range from 2.5 to 20 nm, or from 3 to 15 nm, or from 3.5 to 10 nm, or from 4 to 8 nm.

The $PD_{10}$ pore diameter of the porous particles may be no more than no more than 10 nm, or no more than 9 nm, or no more than 8 nm, or no more than 7 nm, or no more than 6 nm, or no more than 5 nm, or no more than 4 nm, or no more than 3 nm, or no more than 2.5 nm, or no more than 2 nm, or no more than 1.5 nm, or no more than 1 nm. Preferably, the $PD_{10}$ pore diameter of the porous particles is at least 0.3 nm, or at least 0.4 nm, or at least 0.5 nm. For example, the $PD_{10}$ pore diameter of the porous particles is preferably in the range from 0.3 to 10 nm, or from 0.3 to 5 nm, or from 0.3 to 1 nm, or from 0.4 to 1 nm, or from 0.5 to 1 nm.

For the avoidance of doubt, any macropore volume (pore diameter greater than 50 nm) is not taken into account for the purpose of determining $PD_n$ values.

The volumetric ratio of micropores to mesopores in the porous particles may range in principle from 100:0 to 0:100. Preferably, the volumetric ratio of micropores to mesopores is from 90:10 to 55:45, or from 90:10 to 60:40, or from 85:15 to 65:35.

The pore size distribution of the porous particles may be monomodal, bimodal or multimodal. As used herein, the term “pore size distribution” relates to the distribution of pore size relative to the cumulative total internal pore volume of the porous particles. A bimodal or multimodal pore size distribution may be preferred since close proximity between micropores and pores of larger diameter provides the advantage of efficient ionic transport through the porous network to the electroactive material.

The terms “$D_{10}$” and “$D_{10}$ particle diameter” as used herein refer to the 10th percentile volume-based median particle diameter, i.e. the diameter below which 10% by volume of the particle population is found. The terms “$D_{90}$” and “$D_{90}$ particle diameter” as used herein refer to the 90th percentile volume-based median particle diameter, i.e. the diameter below which 90% by volume of the particle population is found.

Optionally, the $D_{50}$ particle diameter of the porous particles may be at least 1 μm, or at least 1.5 μm, or at least 2 μm, or at least 2.5 μm, or at least 3 μm, or at least 4 μm, or at least 5 μm. Optionally the $D_{50}$ particle diameter of the porous particles may be no more than 150 μm, or no more than 100 μm, or no more than 70 μm, or no more than 50 μm, or no more than 40 μm, or no more than 30 μm, or no more than 25 μm, or no more than 20 μm, or no more than 18 μm, or no more than 15 μm, or no more than 12 μm, or no more than 10 μm, or no more than 8 μm.

For instance, the porous particles may have a $D_{50}$ particle diameter in the range from 0.5 to 150 μm, or from 0.5 to 100 μm, or from 0.5 to 50 μm, or from 0.5 to 30 μm, or from 1 to 25 μm, or from 1 to 20 μm, or from 2 to 25 μm, or from 2 to 20 μm, or from 2 to 18 μm, or from 2 to 15 μm, or from 2 to 12 μm, or from 2.5 to 15 μm, or from 2.5 to 12 μm, or from 2 to 10 μm, or from 3 to 20 μm, or from 3 to 18 μm, or from 3 to 15 μm, or from 4 to 18 μm, or from 4 to 15 μm, or from 4 to 12 μm, or from 5 to 15 μm, or from 5 to 12 μm or from 5 to 10 μm, or from 5 to 8 μm. Particles within these size ranges and having porosity and a pore diameter distribution as set out herein are ideally suited for the preparation of composite particles for use in anodes for metal-ion batteries by a CVI process.

The $D_{10}$ particle diameter of the porous particles is preferably at least 0.2 μm, or at least 0.5 μm, or at least 0.8 μm, or at least 1 μm, or at least 1.5 μm, or at least 2 μm. By maintaining the $D_{10}$ particle diameter at 0.2 μm or more, the potential for undesirable agglomeration of sub-micron sized particles is reduced, and improved dispersibility of the composite particles formed.

The Doo particle diameter of the porous particles is preferably no more than 300 μm, or no more than 250 μm, or no more than 200 μm, or no more than 150 μm, or no more than 100 μm, or no more than 80 μm, or no more than 60 μm, or no more than 40 μm, or no more than 30 μm, or no more than 25 μm, or no more than 20 μm.

The porous particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense powder beds is more readily achievable.

The porous particles may have an average sphericity (as defined herein) of more than 0.5. Preferably they have an average sphericity of at least 0.55, or at least 0.6, or at least 0.65, or at least 0.7, or at least 0.75, or at least 0.8, or at least 0.85. Preferably, the porous particles have an average sphericity of at least 0.90, or at least 0.92, or at least 0.93, or at least 0.94, or at least 0.95. Spherical particles are believed to aid uniformity of deposition and facilitate denser packing both in the reaction zone and of the final product when incorporated into electrodes.

It is possible to obtain highly accurate two-dimensional projections of micron scale particles by scanning electron microscopy (SEM) or by dynamic image analysis, in which a digital camera is used to record the shadow projected by a particle. The term “sphericity” as used herein shall be understood as the ratio of the area of the particle projection (obtained from such imaging techniques) to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4 \cdot \pi \cdot A_m}{(C_m)^2}\right]$$

wherein n represents the number of particles in the population. The average sphericity for a population of particles is preferably calculated from the two-dimensional projections of at least 50 particles.

The porous particles may have a BET surface area of at least 100 $m^2/g$, or at least 500 $m^2/g$, or at least 750 $m^2/g$, or at least 1,000 $m^2/g$, or at least 1,250 $m^2/g$, or at least 1,500 $m^2/g$. The BET surface area of the porous particles may be no more than 4,000 $m^2/g$, or no more than 3,500 $m^2/g$, or no more than 3,250 $m^2/g$, or no more than 3,000 $m^2/g$ or no more than 2,500 $m^2/g$, or no more than 2,000 $m^2/g$. For example, the porous particles may have a BET surface area in the range from 100 $m^2/g$ to 4,000 $m^2/g$, or from 500 $m^2/g$ to 4,000 $m^2/g$, or from 750 $m^2/g$ to 3,500 $m^2/g$, or from 1,000 $m^2/g$ to 3,250 $m^2/g$, or from 1,000 $m^2/g$ to 3,000 $m^2/g$, or from 1,000 $m^2/g$ to 2,500 $m^2/g$, or from 1,000 $m^2/g$ to 2,000 $m^2/g$.

The porous particles preferably have a particle density of at least 0.35 and preferably less than 3 $g/cm^3$, more preferably less than 2 $g/cm^3$, more preferably less than 1.5 $g/cm^3$, most preferably from 0.35 to 1.2 $g/cm^3$. As used herein, the term "particle density" refers to "apparent particle density" as measured by mercury porosimetry (i.e. the mass of a particle divided by the particle volume wherein the particle volume is taken to be the sum of the volume of solid material and any closed or blind pores (a "blind pore" is pore that is too small to be measured by mercury porosimetry). Preferably, the porous particles have particle density of at least 0.4 g/cm$^3$, or at least 0.45 g/cm$^3$, or at least 0.5 g/cm$^3$, or at least 0.55 g/cm$^3$, or at least 0.6 g/cm$^3$, or at least 0.65 g/cm$^3$, or at least 0.7 g/cm$^3$. Preferably, the porous particles have particle density of no more than 1.15 g/cm$^3$, or no more than 1.1 g/cm$^3$, or no more than 1.05 g/cm$^3$, or no more than 1 g/cm$^3$, or no more than 0.95 g/cm$^3$, or no more than 0.9 g/cm$^3$.

Preferably the porous particles have:

(i) a total pore volume of micropores and mesopores as measured by nitrogen gas adsorption in the range from 0.4 to 2.2 cm$^3$/g;

(ii) a $PD_{50}$ pore diameter of no more than 20 nm, preferably a $PD_{90}$ pore diameter of no more than 30 nm, preferably a $PD_{30}$ pore diameter of no more than 15 nm;

(iii) a $D_{50}$ particle diameter in the range from 0.5 to 30 μm.

More preferably, the BET surface area of the porous particles is from 1,000 to 3,000 m$^2$/g.

More preferably the porous particles have:

(i) a total pore volume of micropores and mesopores as measured by nitrogen gas adsorption in the range from 0.6 to 1.8 cm$^3$/g;

(ii) a $PD_{50}$ pore diameter of no more than 10 nm, preferably a $PD_{90}$ pore diameter of no more than 20 nm, preferably a $PD_{30}$ pore diameter of no more than 8 nm; and (iii) a $D_{50}$ particle diameter in the range from 1 to 25 μm.

More preferably, the BET surface area of the porous particles is from 1,000 to 3,000 m$^2$/g.

More preferably the porous particles have:

(i) a total pore volume of micropores and mesopores as measured by nitrogen gas adsorption in the range from 0.7 to 1.6 cm$^3$/g;

(ii) a $PD_{50}$ pore diameter of no more than 10 nm, preferably a $PD_{90}$ pore diameter of no more than 20 nm, preferably a $PD_{30}$ pore diameter of no more than 8 nm; and (iii) a $D_{50}$ particle diameter in the range from 1 to 20 μm.

More preferably, the BET surface area of the porous particles is from 1,000 to 3,000 m$^2$/g.

More preferably the porous particles have:

(i) a total pore volume of micropores and mesopores as measured by nitrogen gas adsorption in the range from 0.7 to 1.5 cm$^3$/g;

(ii) a $PD_{50}$ pore diameter of no more than 5 nm, preferably a $PD_{90}$ pore diameter of no more than 10 nm, preferably a $PD_{30}$ pore diameter of no more than 3 nm; and (iii) a $D_{50}$ particle diameter in the range from 2 to 20 μm.

More preferably, the BET surface area of the porous particles is from 1,000 to 3,000 m$^2$/g.

More preferably the porous particles have:

(i) a total pore volume of micropores and mesopores as measured by nitrogen gas adsorption in the range from 0.7 to 1.4 cm$^3$/g;

(ii) a $PD_{50}$ pore diameter of no more than 5 nm, preferably a $PD_{90}$ pore diameter of no more than 10 nm, preferably a $PD_{30}$ pore diameter of no more than 3 nm; and (iii) a $D_{50}$ particle diameter in the range from 2 to 20 μm.

More preferably, the BET surface area of the porous particles is from 1,000 to 2,500 m$^2$/g.

More preferably the porous particles have:

(i) a total pore volume of micropores and mesopores as measured by nitrogen gas adsorption in the range from 0.7 to 1.4 cm$^3$/g;

(ii) a $PD_{50}$ pore diameter of no more than 5 nm, preferably a $PD_{90}$ pore diameter of no more than 10 nm, preferably a $PD_{30}$ pore diameter of no more than 3 nm; and (iii) a $D_{50}$ particle diameter in the range from 2 to 18 μm.

More preferably, the BET surface area of the porous particles is from 1,000 to 2,500 m$^2$/g.

More preferably the porous particles have:

(i) a total pore volume of micropores and mesopores as measured by nitrogen gas adsorption in the range from 0.7 to 1.4 cm$^3$/g;

(ii) a $PD_{50}$ pore diameter of no more than 2 nm, preferably a $PD_{90}$ pore diameter of no more than 5 nm, preferably a $PD_{30}$ pore diameter of no more than 1 nm; and (iii) a $D_{50}$ particle diameter in the range from 2 to 15 μm.

More preferably, the BET surface area of the porous particles is from 1,000 to 2,500 m$^2$/g.

In the case that the silicon-containing precursor is a chlorinated compound, such as a chlorosilane, the silicon-containing precursor may be used in admixture with hydrogen gas, preferably in at least a 1:1 atomic ratio of hydrogen to chlorine.

Optionally, the silicon-containing precursor is free of chlorine. Free of chlorine means that the silicon-containing precursor contains less than 1 wt %, preferably less than 0.1 wt %, preferably less than 0.01 wt % of chlorine-containing compounds.

The temperature effective to cause deposition of silicon in steps (b) and (d) is any temperature that is effective to decompose the silicon-containing precursor to form silicon. Preferably, the temperature effective to cause deposition of silicon in steps (b) and (d) is from 340 to 400° C., or from 340 to 395° C., or from 340 to 390° C., or from 345 to 400° C., or from 345 to 395° C., or from 345 to 390° C., or from 350 to 400° C., or from 350 to 395° C., or from 350 to 390° C., or from 350 to 385° C., or from 350 to 380° C., or from 355 to 400° C., or from 355 to 395° C., or from 355 to 390° C., or from 355 to 385° C., or from 355 to 380° C., or from 360 to 400° C., or from 360 to 395° C., or from 360 to 390° C., or from 360 to 385° C., or from 360 to 380° C., or from 365 to 400° C., or from 365 to 395° C., or from 365 to 390° C., or from 365 to 385° C., or from 365 to 380° C., or from 370 to 400° C., or from 370 to 395° C., or from 370 to 390° C., or from 370 to 385° C., or from 370 to 380° C. A temperature range of from 370 to less than 395° C. is particularly preferred.

The deposition of silicon by CVI results in the elimination of by-products, particularly by-product gases such as hydrogen. Step (c) preferably comprises at least the separation of by-products from the intermediate particles formed. Separation of by-products from the intermediate particles formed may be effected by flushing the reaction zone with an inert gas and/or by evacuating the reaction zone by reducing the pressure. For example, the separation of by-products from the intermediate particles formed may be effected by evacuating the reaction zone to a pressure of less than 100 kPa, or less than 80 kPa, or less than 60 kPa, or less than 40 kPa, or less than 20 kPa, or less than 10 kPa, or less than 5 kPa, or less than 2 kPa, or less than 1 kPa. Evacuating the reaction zone to low pressure may be effective not only to remove by-products in the gas phase, but also to desorb any by-products that may be adsorbed onto the surfaces of the deposited silicon.

In accordance with a preferred implementation of the invention:

(i) the plurality of porous particles have a BET surface area in the range from 500 $m^2/g$ to 4,000 $m^2/g$, (ii) ΔT in step (b) is ≤+80° C.

(iii) the plurality of porous particles is maintained within a temperature range from 340 to 395° C. during step (b);

(iv) the plurality of porous particles in the reaction zone in step (a) has a volume of at least 100 $cm^3/L_{RV}$, and (v) step (b) comprises continuously agitating the porous particles.

In accordance with another preferred implementation of the invention:

(i) the plurality of porous particles have a BET surface area in the range from 750 $m^2/g$ to 3,500 $m^2/g$, (ii) ΔT in step (b) is ≤+60° C.

(iii) the plurality of porous particles is maintained within a temperature range from 350 to 395° C. during step (b);

(iv) the plurality of porous particles in the reaction zone in step (a) has a volume of at least 200 $cm^3/L_{RV}$; and (v) step (b) comprises continuously agitating the porous particles.

In accordance with another preferred implementation of the invention:

(i) the plurality of porous particles have a BET surface area in the range from 1,000 $m^2/g$ to 3,250 $m^2/g$, (ii) ΔT in step (b) is ≤+40° C.

(iii) the plurality of porous particles is maintained within a temperature range from 360 to 395° C. during step (b);

(iv) the plurality of porous particles in the reaction zone in step (a) has a volume of at least 300 $cm^3/L_{RV}$; and (v) step (b) comprises continuously agitating the porous particles.

In accordance with another preferred implementation of the invention:

(i) the plurality of porous particles have a BET surface area in the range from 1,000 $m^2/g$ to 3,000 $m^2/g$, (ii) ΔT in step (b) is ≤+20° C.

(iii) the plurality of porous particles is maintained within a temperature range from 370 to 395° C. during step (b);

(iv) the plurality of porous particles in the reaction zone in step (a) has a volume of at least 400 $cm^3/L_{RV}$; and (v) step (b) comprises continuously agitating the porous particles.

In accordance with another preferred implementation of the invention:

(i) the plurality of porous particles have a BET surface area in the range from 1,000 $m^2/g$ to 2,500 $m^2/g$, (ii) ΔT in step (b) is ≤+10° C.

(iii) the plurality of porous particles is maintained within a temperature range from 370 to 390° C. during step (b);

(iv) the plurality of porous particles in the reaction zone in step (a) has a volume of at least 500 $cm^3/L_{RV}$; and (v) step (b) comprises continuously agitating the porous particles.

In accordance with a preferred implementation of the invention:

(i) the plurality of porous particles have a BET surface area in the range from 500 $m^2/g$ to 4,000 $m^2/g$, (ii) ΔT in step (b) is ≤+80° C.

(iii) the plurality of porous particles is maintained within a temperature range from 340 to 395° C. during step (b);

(iv) the ratio of the internal surface area of the reaction zone to mass of porous particles in the reaction zone in step (a) is no more than 1 $m^2/kg$; and (v) step (b) comprises continuously agitating the porous particles.

In accordance with another preferred implementation of the invention:

(i) the plurality of porous particles have a BET surface area in the range from 750 $m^2/g$ to 3,500 $m^2/g$, (ii) ΔT in step (b) is ≤+60° C.

(iii) the plurality of porous particles is maintained within a temperature range from 350 to 395° C. during step (b);

(iv) the ratio of the internal surface area of the reaction zone to mass of porous particles in the reaction zone in step (a) is no more than 0.8 $m^2/kg$; and (v) step (b) comprises continuously agitating the porous particles.

In accordance with another preferred implementation of the invention:

(i) the plurality of porous particles have a BET surface area in the range from 1,000 $m^2/g$ to 3,250 $m^2/g$, (ii) ΔT in step (b) is ≤+40° C.

(iii) the plurality of porous particles is maintained within a temperature range from 360 to 395° C. during step (b);

(iv) the ratio of the internal surface area of the reaction zone to mass of porous particles in the reaction zone in step (a) is no more than 0.6 $m^2/kg$; and (v) step (b) comprises continuously agitating the porous particles.

In accordance with another preferred implementation of the invention:

(i) the plurality of porous particles have a BET surface area in the range from 1,000 $m^2/g$ to 3,000 $m^2/g$, (ii) ΔT in step (b) is ≤+20° C.

(iii) the plurality of porous particles is maintained within a temperature range from 370 to 395° C. during step (b);

(iv) the ratio of the internal surface area of the reaction zone to mass of porous particles in the reaction zone in step (a) is no more than 0.4 $m^2/kg$; and (v) step (b) comprises continuously agitating the porous particles.

In accordance with another preferred implementation of the invention:

(i) the plurality of porous particles have a BET surface area in the range from 1,000 $m^2/g$ to 2,500 $m^2/g$, (ii) ΔT in step (b) is ≤+10° C.

(iii) the plurality of porous particles is maintained within a temperature range from 370 to 390° C. during step (b);

(iv) the ratio of the internal surface area of the reaction zone to mass of porous particles in the reaction zone in step (a) is no more than 0.2 $m^2/kg$; and (v) step (b) comprises continuously agitating the porous particles.

The process of the invention may further comprise the step of:

forming a modifier material on the surface of the silicon deposited in step (b) and/or step (d).

The modifier material may be a passivation layer formed on the surface of the silicon deposited in step (b) or (d). Accordingly, the process may further comprise contacting the particles from step (b) or (d) with a passivating agent. As defined herein, a passivating agent is a compound of mixture of compounds which is able to react with the surface of the deposited silicon to form a modified surface.

One type of passivation layer is a native oxide layer. A native oxide layer may be formed, for example, by exposing the surface of the silicon to a passivating agent selected from air or another oxygen containing gas. The passivation layer may comprise a silicon oxide of the formula $SiO_x$, wherein $0<x\leq 2$. The silicon oxide is preferably amorphous silicon oxide. The formation of a native oxide layer is exothermic and therefore requires careful process control to prevent overheating or even combustion of the particulate material. In the case that the modifier material formed is a native oxide layer, the process may comprise cooling the material formed in step (b) or (d) to a temperature below 300° C., preferably below 200° C., optionally below 100° C., prior to contacting the surface of the silicon domains with the oxygen containing gas.

Another type of passivation layer is a nitride layer that is formed, for example, by exposing the surface of the silicon to a passivating agent selected from ammonia or another nitrogen containing molecule. The passivation layer may comprise a silicon nitride of the formula $SiN_x$, wherein $0<x\leq 4/3$. The silicon nitride is preferably amorphous silicon nitride. A nitride layer may be formed by contacting the surface of the silicon domains with ammonia at a temperature in the range from 200-700° C., preferably from 400-700° C., more preferably from 400-600° C. The temperature may then be increased if necessary into the range of 500 to 1,000° C. to form a nitride surface (e.g. a silicon nitride surface of the formula SiNx, wherein $x\leq 4/3$). Nitride passivation may be preferred to oxide passivation. As sub-stoichiometric nitrides (such as $SiN_x$, wherein $0<x\leq 4/3$) are conductive, nitride interlayers function as a conductive network that allows for faster charging and discharging of the silicon. Phosphine may also be used as a passivating agent, as a phosphorus analog of ammonia.

Another type of passivation layer is an oxynitride layer that is formed, for example, by exposing the surface of the silicon to a passivating agent comprising ammonia (or another nitrogen containing molecule) and oxygen gas. The passivation layer may comprise a silicon oxynitride of the formula $SiO_xN_y$, wherein $0<x<2$, $0<y<4/3$, and $0<(2x+3y)\leq 4$). The silicon nitride is preferably amorphous silicon oxynitride.

Another type of passivation layer is a carbide layer. The passivation layer may comprise a silicon carbide of the formula $SiC_x$, wherein $0<x\leq 1$. The silicon carbide is preferably amorphous silicon carbide. A carbide layer may be formed by contacting the surface of the silicon with a passivating agent selected from carbon containing precursors, e.g. methane or ethylene at elevated temperatures, e.g in the range from 250 to 700° C. At lower temperatures, covalent bonds are formed between the surface of the silicon and the carbon-containing precursors, which are the converted to a monolayer of crystalline silicon carbide as the temperature is increased. The modifier material domains may comprise a silicon carbide of the formula SiCx, wherein $0<x\leq 1$.

Other suitable passivating agents include compounds comprising an alkene, alkyne or carbonyl functional group, more preferably a terminal alkene, terminal alkyne, aldehyde or ketone group.

Preferred passivating agents include one or more compounds of the formulae:

$$R^1—CH{=}CH—R^1; \quad (i)$$

$$R^1—C{\equiv}C—R^1; \text{ and} \quad (ii)$$

$$O{=}CR^1R^1; \quad (iii)$$

wherein each $R^1$ independently represents H or an unsubstituted or substituted aliphatic or aromatic hydrocarbyl group having from 1 to 20 carbon atoms, or wherein two $R^1$ groups form an unsubstituted or substituted ring structure comprising from 3 to 8 carbon atoms in the ring.

Particularly preferred passivating agents include one or more compounds of the formulae:

$$CH_2{=}CH—R^1; \text{ and} \quad (i)$$

$$HC{\equiv}C—R^1; \quad (ii)$$

wherein $R^1$ is as defined above. Preferably, $R^1$ is unsubstituted.

Examples of suitable passivating agents include ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo[2.2.2]oct-2-ene. Optionally, mixtures of different passivating agents may also be used.

It is believed that passivating agents comprising an alkene, alkyne or carbonyl group undergo an insertion reaction with M-H groups at the surface of the silicon (where M represents an atom of the silicon) to form a covalently passivated surface which is resistant to oxidation by air. The passivation reaction between the silicon surface and the passivating agent may be understood as a form of hydrosilylation, as shown schematically below.

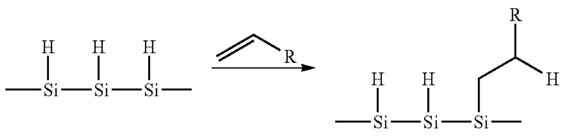

Other suitable passivating agents include compounds including an active hydrogen atom bonded to oxygen, nitrogen, sulphur or phosphorus. For example, the passivating agent may be an alcohol, amine, thiol or phosphine. Reaction of the group —XH with hydride groups at the surface of the silicon is understood to result in elimination of $H_2$ and the formation of a direct bond between X and the silicon surface.

Suitable passivating agents in this category include compounds of the formula $$HX—R^2, \text{ and} \quad (iv)$$

$$HX—C(O)—R^1, \quad (v)$$

wherein X represents O, S, $NR^1$ or $PR^1$; each $R^1$ is independently as defined above; and $R^2$ represents an unsubstituted or substituted aliphatic or aromatic hydrocarbyl group having from 1 to 20 carbon atoms, or $R^1$ and $R^2$ together form an unsubstituted or substituted ring structure comprising from 3 to 8 carbon atoms in the ring.

Preferably X represents O or NH.

Preferably $R^2$ represents an optionally substituted aliphatic or aromatic group having from 2 to 10 carbon atoms. Amine groups may also be incorporated into a 4-10 membered aliphatic or aromatic ring structure, as in pyrrolidine, pyrrole, imidazole, piperazine, indole, or purine.

Contacting of the silicon with the passivating agent may be carried out at a temperature in the range of 25 to 700° C., preferably at a temperature in the range of from 50 to 500° C., more preferably from 100 to 300° C.

The modifier material formed may optionally comprise a pyrolytic carbon material deposited onto the surface of the silicon by thermal decomposition of a carbon-containing precursor, i.e. by a chemical vapour infiltration (CVI) method. Deposition of a pyrolytic carbon material may be advantageous as it forms a conductive network between silicon domains which may facilitate electron transport within the composite particles. The process may therefore comprise contacting the intermediate particles from step (b) or (d) with a carbon-containing precursor, preferably a hydrocarbon, at a temperature effective to cause deposition of a pyrolytic carbon material in the pores of the intermediate particles.

Suitable hydrocarbons include polycyclic hydrocarbons comprising from 10 to 25 carbon atoms and optionally from 1 to 3 heteroatoms, optionally wherein the polyaromatic hydrocarbon is selected from naphthalene, substituted naphthalenes such as di-hydroxynaphthalene, anthracene, tetracene, pentacene, fluorene, acenapthene, phenanthrene, fluoranthrene, pyrene, chrysene, perylene, coronene, fluorenone, anthraquinone, anthrone and alkyl-substituted derivatives thereof. Suitable pyrolytic carbon precursors also include bicyclic monoterpenoids, optionally wherein the bicyclic monoterpenoid is selected from camphor, borneol, eucalyptol, camphene, careen, sabinene, thujene and pinene. Further suitable pyrolytic carbon precursors include $C_2$-$C_{10}$ hydrocarbons, optionally wherein the hydrocarbons are selected from alkanes, alkenes, alkynes, cycloalkanes, cycloalkenes, and arenes, for example methane, ethylene, propylene, limonene, styrene, cyclohexane, cyclohexene, α-terpinene and acetylene. Other suitable pyrolytic carbon precursors include phthalocyanine, sucrose, starches, graphene oxide, reduced graphene oxide, pyrenes, perhydropyrene, triphenylene, tetracene, benzopyrene, perylenes, coronene, and chrysene. A preferred carbon precursor is acetylene.

A suitable temperature for the deposition of a pyrolytic carbon material is in the range from 300 to 800° C., or from 400 to 700° C. For example, the temperature may be no more than 680° C. or no more than 660° C., or no more than 640° C. or no more than 620° C., or no more than 600° C., or no more than 580° C., or no more than 560° C., or no more than 540° C., or no more than 520° C., or no more than 500° C. The minimum temperature will depend on the type of carbon precursor that is used. Preferably, the temperature is at least 300° C., or at least 350° C., or at least 400° C., or at least 450° C., or at least 500° C.

The carbon-containing precursors used may be used in pure form, or diluted mixture with an inert carrier gas, such as nitrogen or argon. For instance, the carbon-containing precursor may be used in an amount in the range from 0.1 to 100 vol %, or 0.5 to 20 vol %, or 1 to 10 vol %, or 1 to 5 vol % based on the total volume of the precursor and the inert carrier gas. The presence of oxygen should be minimised to prevent undesired oxidation of the deposited electroactive material. Preferably, the oxygen content is less than 0.01 vol %, more preferably less than 0.001 vol % based on the total volume of gas.

In the case that a pyrolytic carbon material is deposited, the same compound may function as both a passivating agent and the pyrolytic carbon precursor. For example, if styrene is selected as the pyrolytic carbon precursor, then it will also function as a passivating agent if the intermediate particles from step (b) are not exposed to oxygen prior to contact with styrene. In this case, passivation and deposition of the conductive carbon material in steps may be carried out simultaneously, for example at a temperature in the range of from 300-700° C. Alternatively, passivation and deposition of the conductive carbon material may be carried out sequentially, with the same material as the passivating agent and the pyrolytic carbon precursor, but wherein the deposition of the pyrolytic carbon precursor is carried out at a higher temperature than the passivation. For example, passivation may be carried out at a temperature in the range of from 25° C. to less than 300° C., and deposition of pyrolytic carbon may be carried out at a temperature in the range from 300-700° C. These two steps may suitably be carried out sequentially by increasing the temperature while maintaining contact with the compound that functions as both a passivating agent and the pyrolytic carbon precursor. At lower temperatures (e.g. in the range of 25° C. to <300° C.) passivation will be the primary process. As the temperature is increased (e.g. to 300-700° C.) the deposition of pyrolytic carbon will ensue.

A range of different silicon loadings in the composite particles may be obtained using the process of the invention. For example, the amount of silicon in the composite particles may be in the range of from 5 to 85 wt % based on the total mass of the composite particles. Preferably, the amount of silicon in the composite particles is from 10 to 85 wt %, or from 15 to 85 wt %, or from 20 to 80 wt %, or from 25 to 80 wt %, or from 30 to 75 wt %, or from 35 to 75 wt %, or from 40 to 70 wt %, or from 45 to 65 wt % based on the total mass of the composite particles. The total silicon loading in the composite particles is the sum of the silicon deposited in steps (b) and (d) (including repetitions of step (d)).

The amount of silicon in the composite particles is preferably selected such that at least 20% and up to 90% of the internal pore volume of the porous particles is occupied by the silicon. For example, the silicon may occupy from 20% to 80%, or from 25% to 75%, or from 30% to 70%, or from 35 to 65%, or from 40 to 60%, or from 45% to 55% of the internal pore volume of the porous particles. Within these preferred ranges, the remaining pore volume of the porous particles is effective to accommodate expansion of the silicon during charging and discharging, without a large excess pore volume which does not contribute to the volumetric capacity of the particulate particles. However, the amount of silicon is also not so high as to impede effective lithiation due to inadequate metal-ion diffusion rates or due to inadequate expansion volume resulting in mechanical resistance to lithiation.

The amount of silicon in the composite particles can be related to the available pore volume in the porous particles by the requirement that the mass ratio of silicon to the porous particles is in the range from $[0.5 \times P^1$ to $1.9 \times P^1]:1$, wherein $P^1$ is a dimensionless quantity having the magnitude of the total pore volume of micropores and mesopores in the porous particles, as expressed in $cm^3/g$ (e.g. if the porous particles have a total volume of micropores and mesopores of 1.2 $cm^3/g$, then $P^1=1.2$). This relationship takes into account the density of silicon and the pore volume of the porous particles to define a weight ratio of silicon at which the pore volume is around 20% to 82% occupied.

The amount of silicon in the composite particles can be determined by elemental analysis. Preferably, elemental analysis is used to determine the elemental composition of the porous particles alone and the composition of the composite particles.

Silicon content is preferably determined by ICP-OES (Inductively coupled plasma-optical emission spectrometry). A number of ICP-OES instruments are commercially available, such as the iCAP® 7000 series of ICP-OES analysers available from ThermoFisher Scientific. The carbon content of the composite particles and of the porous carbon particles alone (as well as the hydrogen, nitrogen and oxygen content if required) are preferably determined by IR absorption. A suitable instrument for determining carbon, hydrogen, nitrogen and oxygen content is the TruSpec® Micro elemental analyser available from Leco Corporation.

Preferably at least 90 wt %, more preferably at least 95 wt %, even more preferably at least 98 wt % of the silicon in the composite particles is located within the internal pore volume of the porous particles such that there is no or very little silicon located on the external surfaces of the composite particles. As discussed above, deposition of silicon in a CVI process occurs at the surfaces of the porous particles.

The process of the invention may further comprise the step:

(e) forming a plurality of modifier material domains in the pores and/or on the outer surface of the composite particles from step (b) or (d).

Step (e) is carried out immediately after the final silicon deposition step (i.e. step (b), or step (d), or the final repetition of step (d) in the case that steps (c) and (d) are repeated). The formation or modifier material domains is analogous to the step as described above, except that step (e) is performed after the final silicon deposition step, whereas the former step may be performed between consecutive electroactive material deposition steps.

Any of the modifier materials and deposition conditions disclosed herein apply to both steps.

The modifier material domains formed in step (e) may comprise the same or different modifier materials from the modifier material domains formed in the former step.

Optionally, step (e) comprises contacting the composite particles from step (b) or (d) with a passivating agent. Preferred passivating agents and passivation conditions are as set out above.

Optionally, step (e) comprises depositing a lithium ion permeable material into the pores and/or onto the outer surface of the composite particles from step (b) or (d). This provides a further improvement in the performance of the composite particles when used as an electroactive material for lithium-ion batteries, by reducing the surface area of the composite particles and by sealing the electroactive material domains away from electrolyte access.

A lithium ion permeable material may be deposited immediately after the final electroactive material deposition step. Alternatively, a lithium ion permeable material may be deposited after first carrying out a passivation step in step (e) as discussed above.

A suitable lithium ion permeable material is a pyrolytic carbon material. A pyrolytic carbon material may be obtained by a chemical vapour infiltration (CVI) method, i.e. by thermal decomposition of a volatile carbon-containing gas (e.g. ethylene) onto the surface of the composite particles.

A suitable process for depositing a pyrolytic carbon material comprises combining the composite particles from the step (b) or (d) with a pyrolytic carbon precursor; and heating the pyrolytic carbon precursor to a temperature effective to cause the deposition of a pyrolytic conductive carbon material into the pores and/or onto the outer surface of the composite particles.

Preferred pyrolytic carbon precursors and pyrolysis conditions are as set out above.

In the case that the lithium-ion permeable material is a pyrolytic carbon material, the same compound may function as both a passivating agent and as a pyrolytic carbon precursor in step (e). Suitable conditions for passivating and forming a pyrolytic carbon material using the same compound as the passivating agent and the pyrolytic carbon precursor in step (e) are as set out above.

Alternatively, different compounds may be used as the passivating agent and as the pyrolytic carbon precursor in step (e). For example, the passivating agent could be styrene, and the pyrolytic carbon precursor could be a compound such as cyclohexane which is capable of forming a pyrolytic carbon material but is not capable of passivating the silicon surface.

Composite particles obtained by the process of the invention can be characterised by their performance under thermogravimetric analysis (TGA) in air. This method of analysis relies on the principle that a weight gain is observed when silicon is oxidized in air and at elevated temperature.

As defined herein, "surface silicon" is calculated from the initial mass increase in the TGA trace from a minimum between 150° C. and 500° C. to the maximum mass measured in the temperature range between 550° C. and 650° C., wherein the TGA is carried out in air with a temperature ramp rate of 10° C./min. This mass increase is assumed to result from the oxidation of surface silicon and therefore allows the percentage of surface silicon as a proportion of the total amount of silicon to be determined according to the following formula:

$$Y = 1.875 \times \left[(M_{max} - M_{min})/M_f\right] \times 100\%$$

Wherein Y is the percentage of surface silicon as a proportion of the total silicon in the sample, $M_{max}$ is the maximum mass of the sample measured in the temperature range between 550° C. to 650° C., $M_{min}$ is the minimum mass of the sample above 150° C. and below 500° C., and $M_f$ is the mass of the sample at completion of oxidation at 1400° C. For completeness, it will be understood that 1.875 is the molar mass ratio of $SiO_2$ to $O_2$ (i.e. the mass ratio of $SiO_2$ formed to the mass increase due to the addition of oxygen). Typically, the TGA analysis is carried out using a sample size of 10 mg±2 mg.

It has been found that reversible capacity retention over multiple charge/discharge cycles is considerably improved when the surface silicon as determined by the TGA method described above is at least 20 wt % of the total amount of silicon in the material. Preferably at least 22 wt %, or at least 25 wt %, at least 30 wt % of the silicon, or at least 35 wt % of the silicon, or at least 40 wt % of the silicon, or at least 45 wt % of the silicon is surface silicon as determined by thermogravimetric analysis (TGA).

In addition to the surface silicon content, the silicon-containing composite particles obtained by the process of the invention preferably have a low content of coarse bulk silicon as determined by TGA. Coarse bulk silicon is defined herein as silicon which undergoes oxidation above 800° C. as determined by TGA, wherein the TGA is carried out in air with a temperature ramp rate of 10° C./min. The coarse bulk silicon content is therefore determined according to the following formula:

$$Z = 1.875 \times [(M_f - M_{800})/M_f] \times 100\%$$

Wherein Z is the percentage of unoxidized silicon at 800° C., $M_{800}$ is the mass of the sample at 800° C., and $M_f$ is the mass of ash at completion of oxidation at 1400° C. For the purposes of this analysis, it is assumed that any mass increase above 800° C. corresponds to the oxidation of silicon to $SiO_2$ and that the total mass at completion of oxidation is $SiO_2$.

Silicon that undergoes oxidation above 800° C. is less desirable. Preferably, no more than 10 wt %, or no more than 8 wt %, or no more than 6 wt %, or no more than 5 wt %, or no more than 4 wt %, or no more than 3 wt %, or no more than 2 wt %, or no more than 1.5 wt % of the silicon is coarse bulk silicon as determined by TGA.

Preferably, at least 20 wt % of the silicon is surface silicon and no more than 10 wt % of the silicon is coarse bulk silicon, wherein both are determined by TGA. More preferably, at least 25 wt % of the silicon is surface silicon and no more than 10 wt % of the silicon is coarse bulk silicon, wherein both are determined by TGA. More preferably, at least 30 wt % of the silicon is surface silicon and no more than 10 wt % of the silicon is coarse bulk silicon, wherein both are determined by TGA. More preferably, at least 35 wt % of the silicon is surface silicon and no more than 8 wt % of the silicon is coarse bulk silicon, wherein both are determined by TGA. More preferably, at least 40 wt % of the silicon is surface silicon and no more than 5 wt % of the silicon is coarse bulk silicon, wherein both are determined by TGA. More preferably, at least 45 wt % of the silicon is surface silicon and no more than 2 wt % of the silicon is coarse bulk silicon, wherein both are determined by TGA.

The composite particles obtained according to the process of the invention preferably have a BET surface area of no more than 300 $m^2/g$, or no more than 250 $m^2/g$, or no more than 200 $m^2/g$, or no more than 150 $m^2/g$. More preferably, no more than 100 $m^2/g$, or no more than 80 $m^2/g$, or no more than 60 $m^2/g$, or no more than 40 $m^2/g$, or no more than 30 $m^2/g$, or no more than 25 $m^2/g$, or no more than 20 $m^2/g$, or no more than 15 $m^2/g$, or no more than 10 $m^2/g$, or no more than 5 $m^2/g$. In general, a low BET surface area is preferred in order to minimize the formation of solid electrolyte interphase (SEI) layers at the surface of the composite particles during the first charge-discharge cycle of an anode. However, a BET surface area which is excessively low results in unacceptably low charging rate and capacity due to the inaccessibility of the bulk of the silicon to metal ions in the surrounding electrolyte. The BET surface area is preferably at least 0.1 $m^2/g$, or at least 1 $m^2/g$, or at least 2 $m^2/g$, or at least 5 $m^2/g$. For instance, the BET surface area of the composite particles may be in the range from 0.1 to 100 $m^2/g$, or from 0.1 to 80 $m^2/g$, or from 0.5 to 60 $m^2/g$, or from 0.5 to 40 $m^2/g$, or from 1 to 30 $m^2/g$, or from 1 to 25 $m^2/g$, or from 2 to 20 $m^2/g$.

In a third aspect, the invention provides composite particles that are obtainable according to the process of the first aspect of the invention.

In a fourth aspect of the invention, there is provided a composition comprising composite particles according to the third aspect of the invention and at least one other component. In particular, there is provided a composition comprising composite particles according to the third aspect of the invention and at least one other component selected from: (i) a binder; (ii) a conductive additive; and (iii) an additional particulate electroactive material. The composition according to the fourth aspect of the invention is useful as an electrode composition, and thus may be used to form the active layer of an electrode.

In a fifth aspect, the invention provides an electrode comprising composite particles according to the third aspect of the invention in electrical contact with a current collector. The particulate material used to prepare the electrode of the fifth aspect of the invention may be in the form of a composition according to the fourth aspect of the invention.

As used herein, the term current collector refers to any conductive substrate that is capable of carrying a current to and from the electroactive particles in the composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range from 10 μm to 1 mm, for example from 20 to 500 μm, or from 50 to 200 μm.

The electrode of the fifth aspect of the invention may be used as the anode of a metal-ion battery. Thus, in a sixth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably, the rechargeable metal-ion battery of the invention is a lithium-ion battery, and the cathode active material is capable of releasing and accepting lithium ions.

EXAMPLES

Example 1

Silicon-carbon composite particles were prepared by placing porous carbon particles inside a stainless steel autoclave with an agitator and gas inlet and outlet lines. The autoclave was purged with nitrogen gas, and then the furnace temperature was set to 500° C. Before the temperature of the particle bed reached 500° C., the gas supply was switched from nitrogen to pure monosilane. After one hour, the furnace was switched off and the autoclave was slowly depressurised. The autoclave was then refilled with monosilane and heated again to 500° C. and held for a further hour. Switching off the furnace, refilling and heating were each repeated as many times as required for the target silicon content. After dosing had finished, the autoclave was purged using nitrogen and exposed to gradually increasing concentrations of oxygen in order to passivate the composite particles before being cooled down to room temperature.

FIG. 1 shows the representative temperature of the internal surfaces of the reaction zone and the temperature within the plurality of particles in this example.

Figure 2:
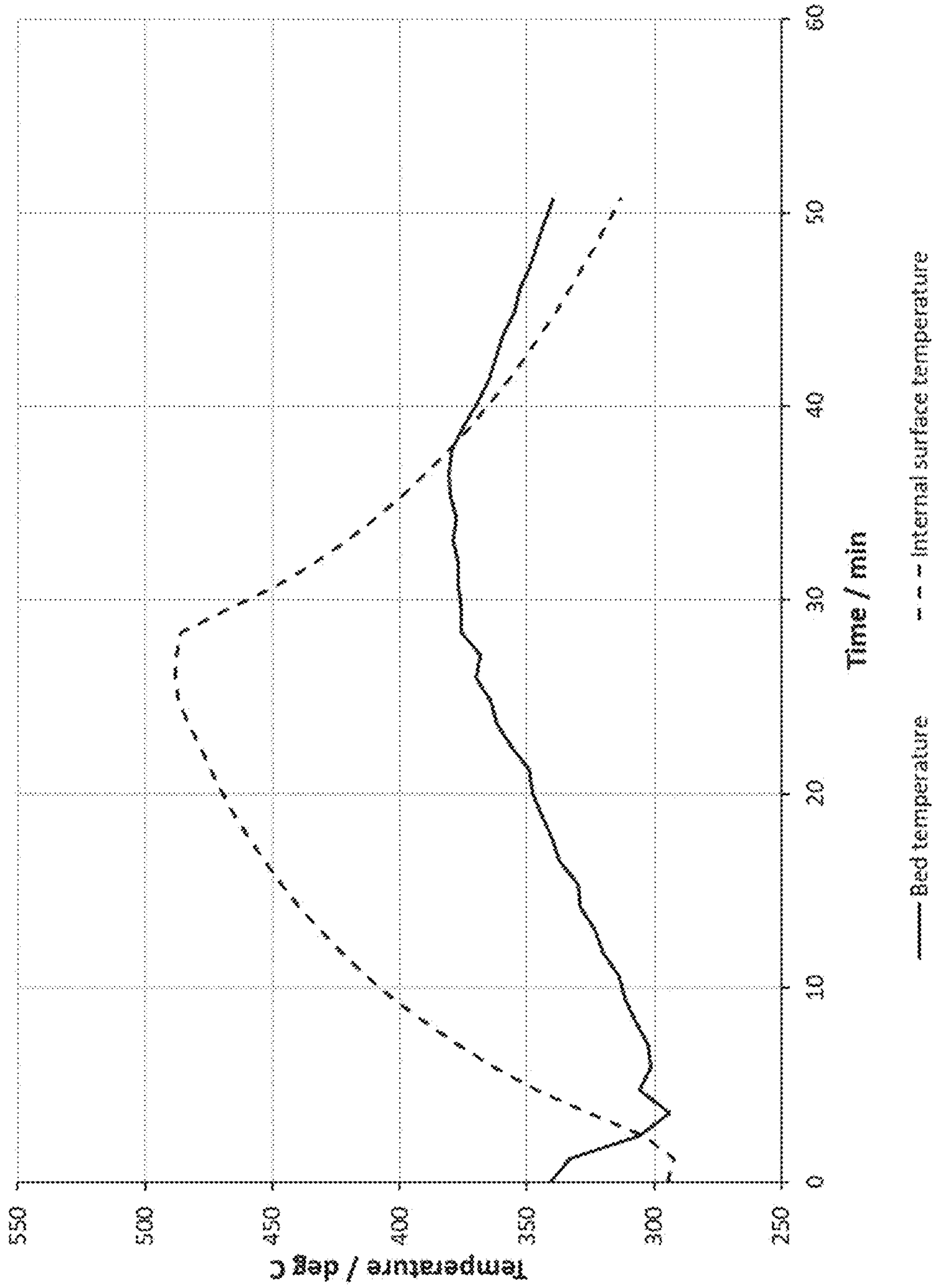
FIG. 2 is a graph showing the representative temperature of the internal surfaces of the reaction zone and the temperature within the plurality of particles during one cycle of silicon deposition of the comparative process shown in FIG. 1.

FIG. 2 shows the representative temperature of the internal surfaces of the reaction zone and the temperature within the plurality of particles during one cycle of silicon deposition in this example.

It is observed that the representative temperature of the internal surfaces of the reaction zone significantly exceeds the temperature within the plurality of particles at most times during contacting of the gas comprising a silicon-containing precursor with the porous particles. Under these conditions, significant soiling of the reaction zone occurred and large flakes of a composite rich in silicon formed. It is expected that shutdown and cleaning of the reaction zone would be needed after the process, rendering the process inoperable.

Example 2

Silicon-carbon composite particles were prepared by placing porous carbon particles inside a stainless steel autoclave with an agitator and gas inlet and outlet lines. The autoclave was purged with nitrogen gas, and then the furnace temperature was set to 430° C. Before the temperature of the particle bed reached 370° C., monosilane was added to the autoclave. After one hour, the furnace was switched off and the autoclave was slowly depressurised. The autoclave was then refilled with monosilane and heated again to 430° C. and held for a further hour. Switching off the furnace, refilling and heating were each repeated as many times as required for the target silicon content. After dosing had finished, the autoclave was purged using nitrogen and exposed to gradually increasing concentrations of oxygen in order to passivate the composite particles before being cooled down to room temperature.

Figure 3:
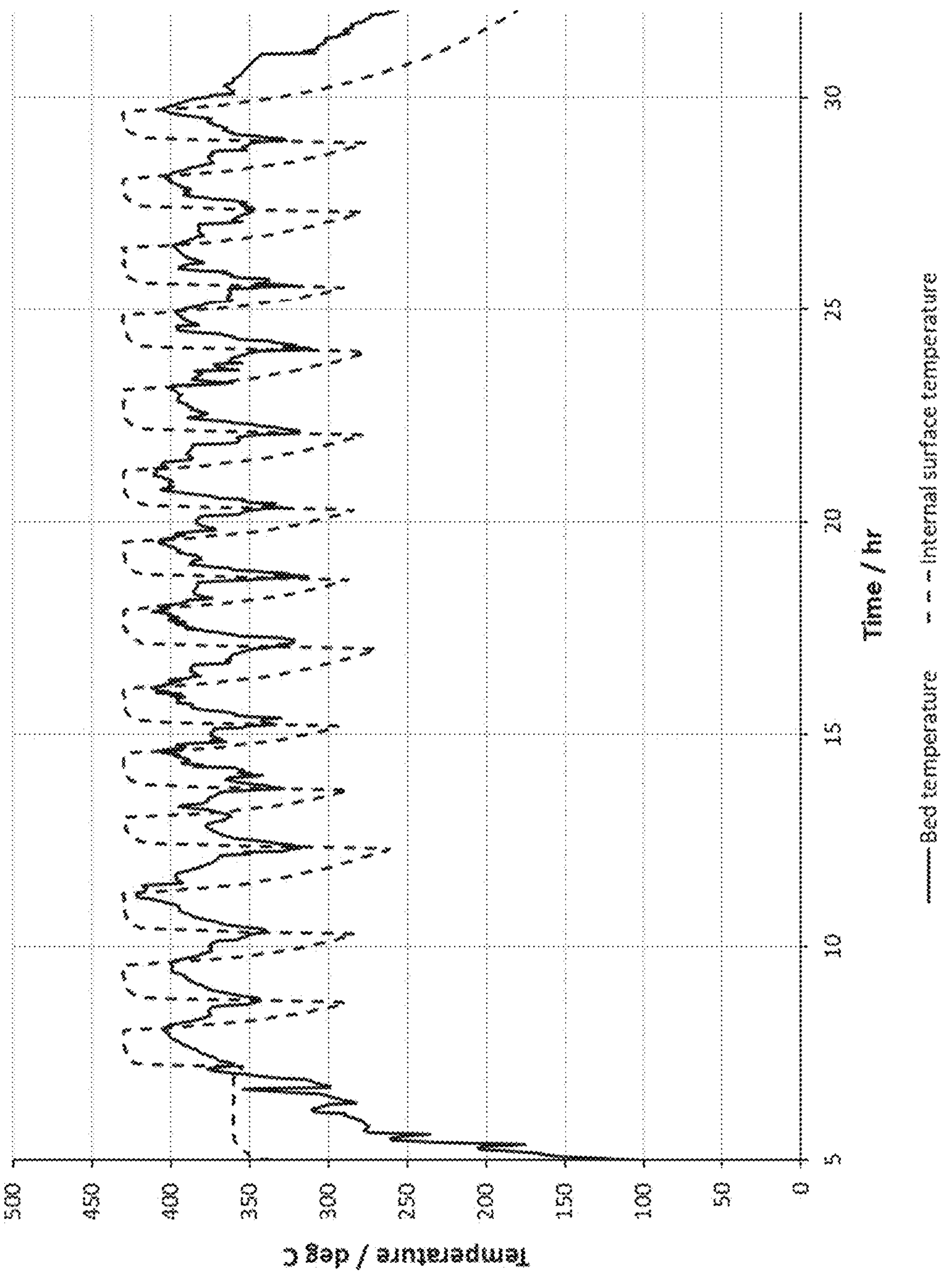
FIG. 3 is a graph showing the representative temperature of the internal surfaces of the reaction zone and the temperature within the plurality of particles of a comparative process.

FIG. 3 shows the representative temperature of the internal surfaces of the reaction zone and the temperature within the plurality of particles in this example.

Figure 4:
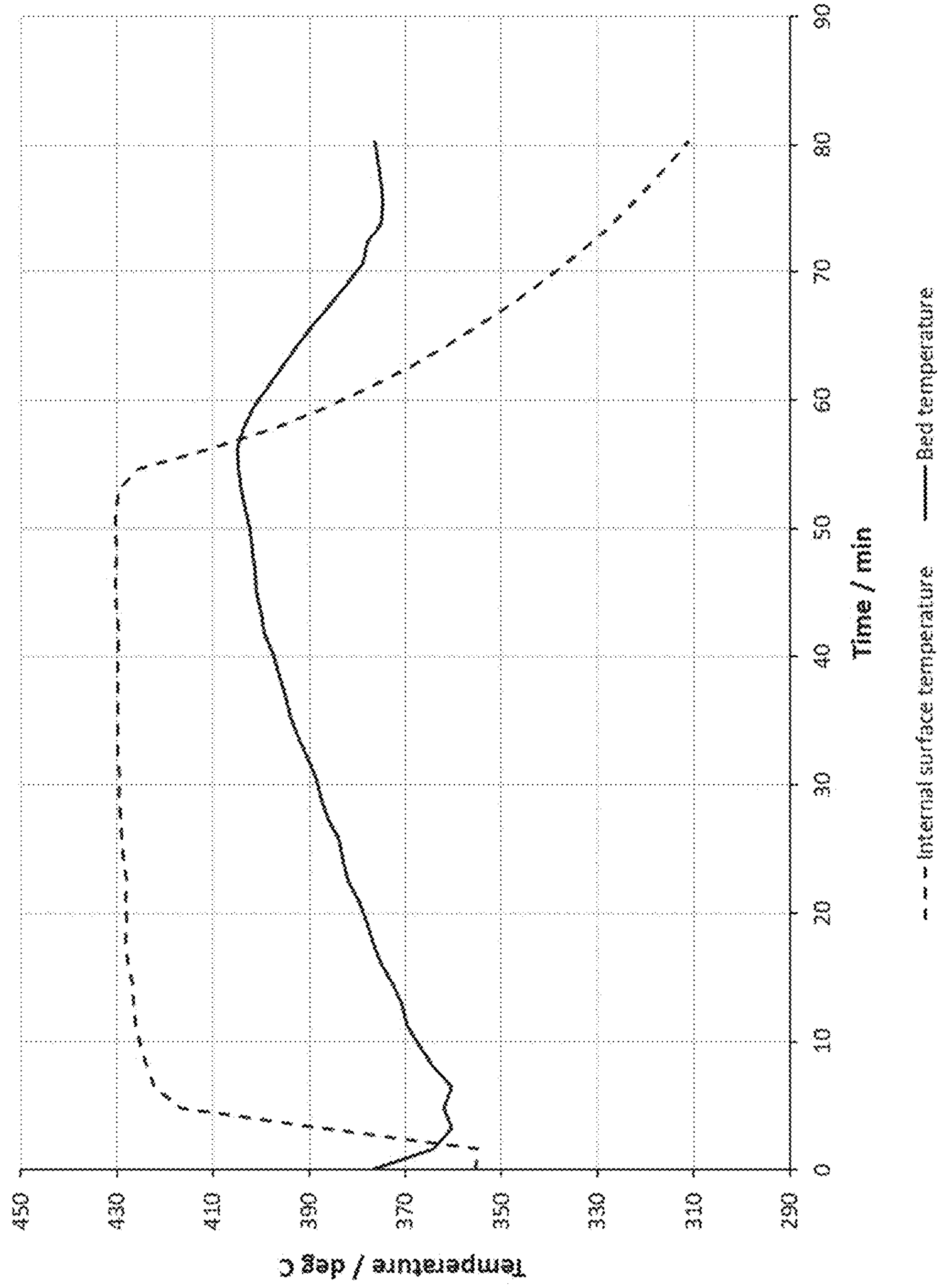
FIG. 4 is a graph showing the representative temperature of the internal surfaces of the reaction zone and the temperature within the plurality of particles during one cycle of silicon deposition of the comparative process shown in FIG. 3.

FIG. 4 shows the representative temperature of the internal surfaces of the reaction zone and the temperature within the plurality of particles during one cycle of silicon deposition in this example.

It is observed that the representative temperature of the internal surfaces of the reaction zone exceeds the temperature within the plurality of particles at most times during contacting of the gas comprising a silicon-containing precursor with the porous particles. In comparison to the deposition conditions shown in FIG. 1, the difference in temperature of the internal surfaces of the reaction zone and the temperature within the plurality of particles at any given time is smaller. Under these conditions, significant soiling of the reaction zone occurred and large flakes of a composite rich in silicon formed. It is expected that shutdown and cleaning of the reaction zone would be needed after the process, rendering the process inoperable.

Example 3

Silicon-carbon composite particles were prepared by placing porous carbon particles inside a stainless steel autoclave with an agitator and gas inlet and outlet lines. The autoclave was purged with nitrogen gas, and then the furnace temperature was set to 400° C. After the temperature of the particle bed reached 350° C., monosilane was added to the autoclave. After one hour, the autoclave was slowly depressurised. The autoclave was then refilled with monosilane and held for a further hour. Depressurising and refilling were each repeated as many times as required for the target silicon content. After dosing had finished, the autoclave was purged using nitrogen and exposed to gradually increasing concentrations of oxygen in order to passivate the composite particles before being cooled down to room temperature.

Figure 5:
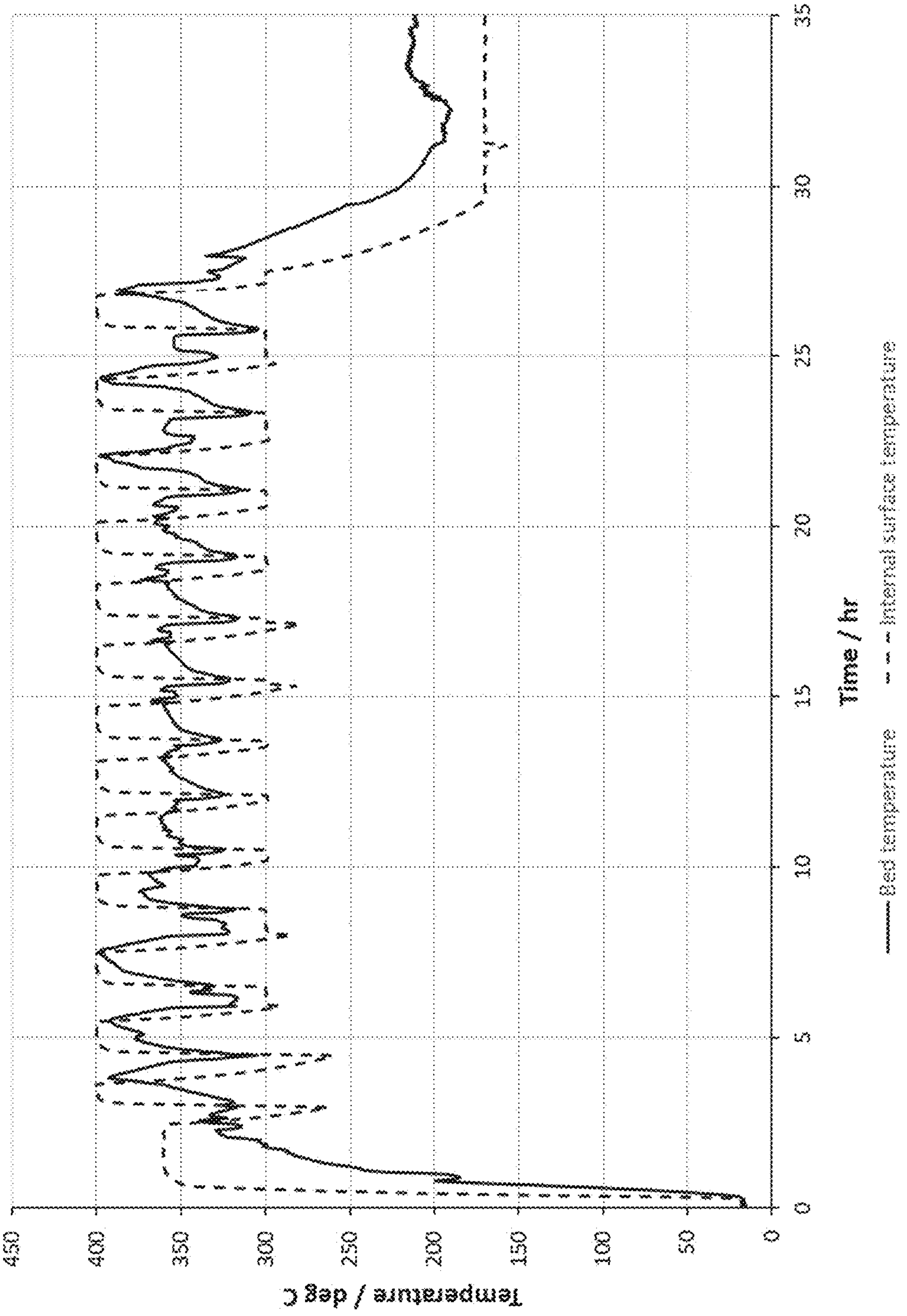
FIG. 5 is a graph showing the representative temperature of the internal surfaces of the reaction zone and the temperature within the plurality of particles of a process according to the invention.

FIG. 5 shows the representative temperature of the internal surfaces of the reaction zone and the temperature within the plurality of particles in this example.

Figure 6:
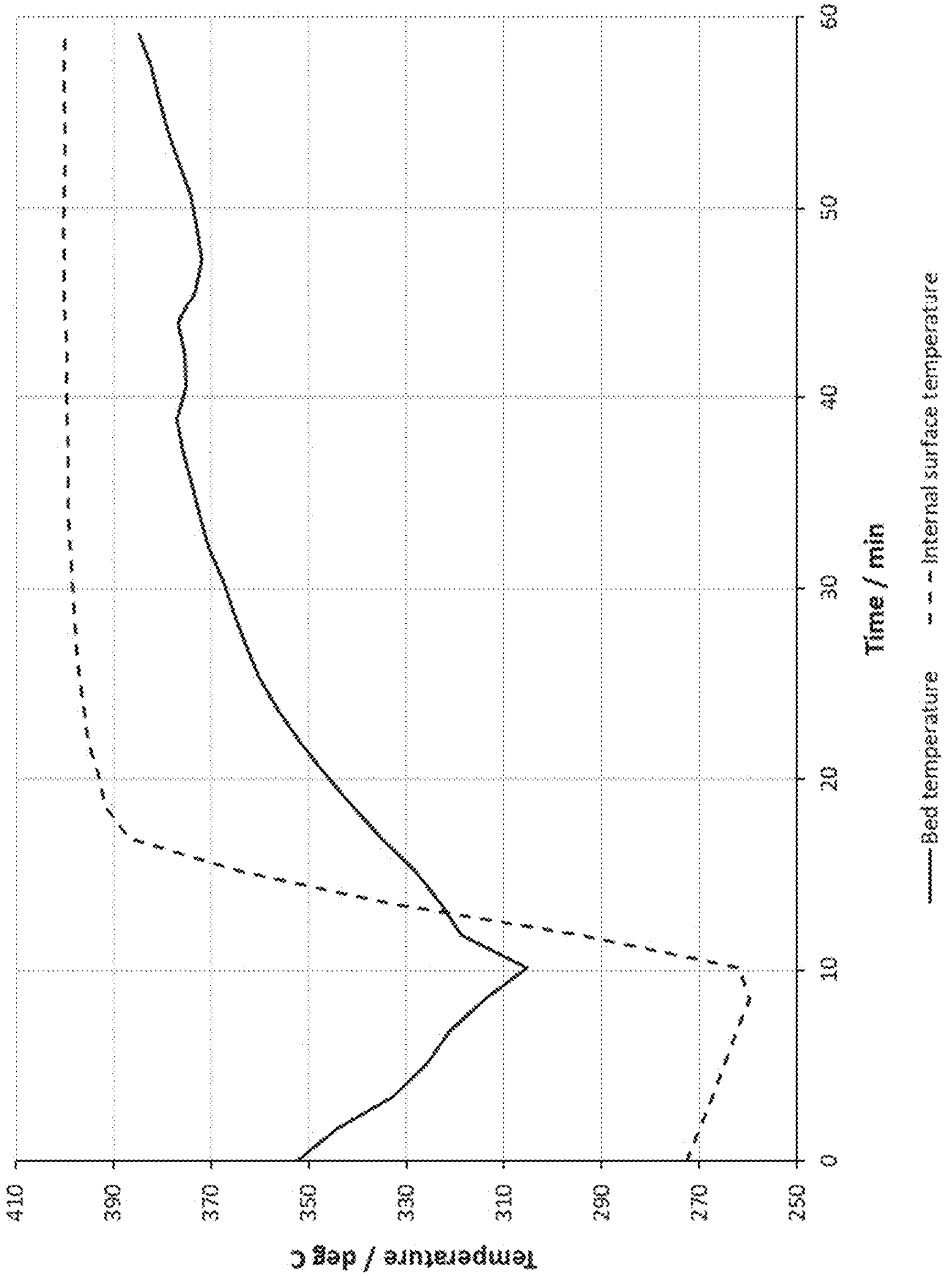
FIG. 6 is a graph showing the representative temperature of the internal surfaces of the reaction zone and the temperature within the plurality of particles during one cycle of silicon deposition of the process shown in FIG. 5.

FIG. 6 shows the representative temperature of the internal surfaces of the reaction zone and the temperature within the plurality of particles during one cycle of silicon deposition in this example.

In comparison to the deposition conditions shown in FIGS. 1-4, when the temperature of the internal surfaces of the reaction zone exceeded the temperature within the plurality of particles in FIGS. 5 and 6, the difference in temperature of the internal surfaces of the reaction zone and the temperature within the plurality of particles at any given time was smaller. Under these conditions, soiling of the reaction zone occurred; however, compared to Examples 1 and 2, the flakes of composite rich in silicon were smaller and within tolerance. This process is expect to be operable, but shutdown and cleaning of the reaction zone would be required.

Example 4

Silicon-carbon composite particles were prepared by placing porous carbon particles inside a stainless steel autoclave with an agitator and gas inlet and outlet lines. The autoclave was purged with nitrogen gas, and then the furnace temperature was set to 350° C. After the temperature of the particle bed reached 350° C., monosilane was added to the autoclave. After one hour, the autoclave was slowly depressurised. The autoclave was then refilled with monosilane and held for a further hour. Depressurising and refilling were each repeated as many times as required for the target silicon content. After dosing had finished, the autoclave was purged using nitrogen and exposed to gradually increasing concentrations of oxygen in order to passivate the composite particles before being cooled down to room temperature.

Figure 7:
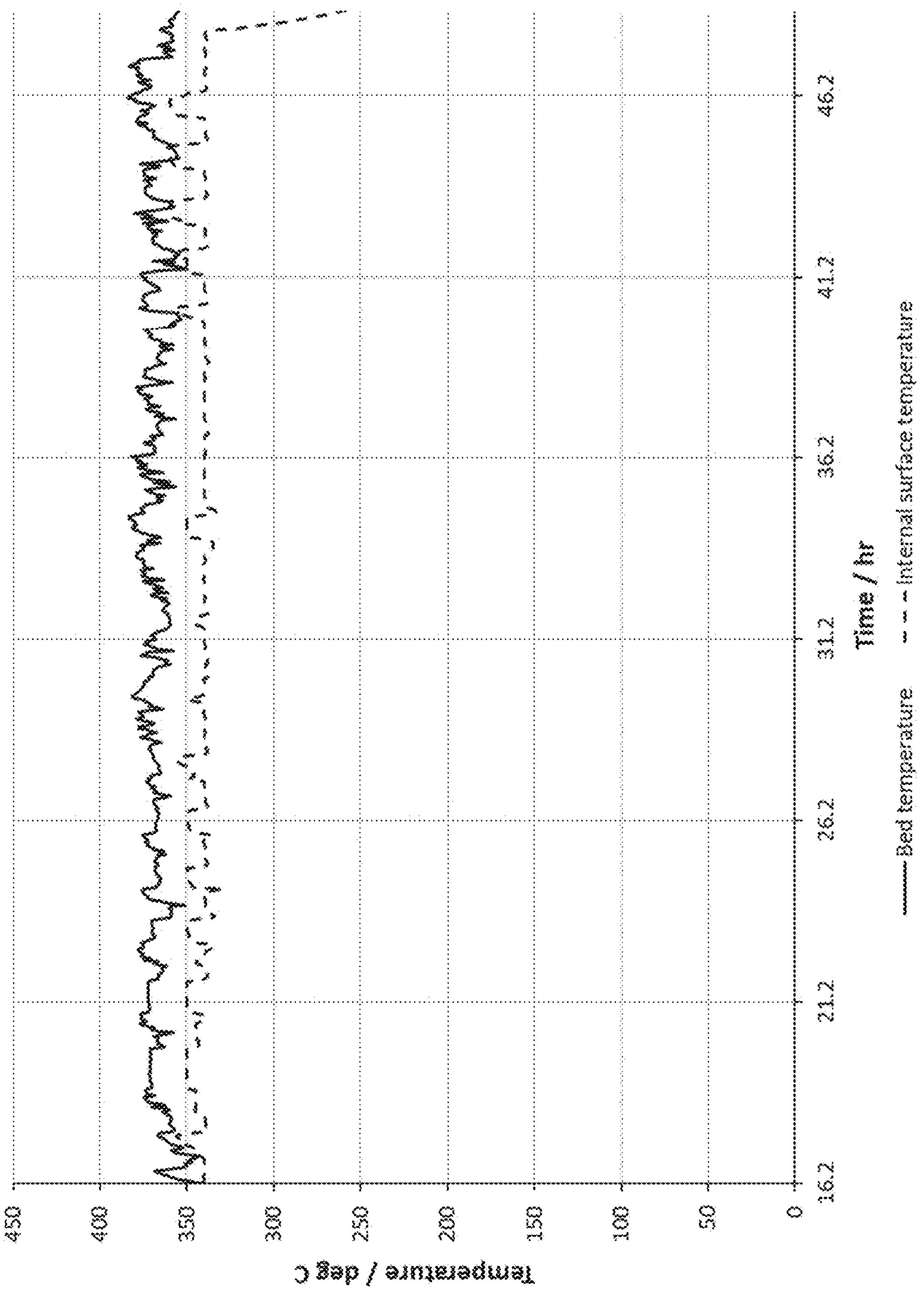
FIG. 7 is a graph showing the representative temperature of the internal surfaces of the reaction zone and the temperature within the plurality of particles of a process according to the invention.

FIG. 7 shows the representative temperature of the internal surfaces of the reaction zone and the temperature within the plurality of particles in this example.

Figure 8:
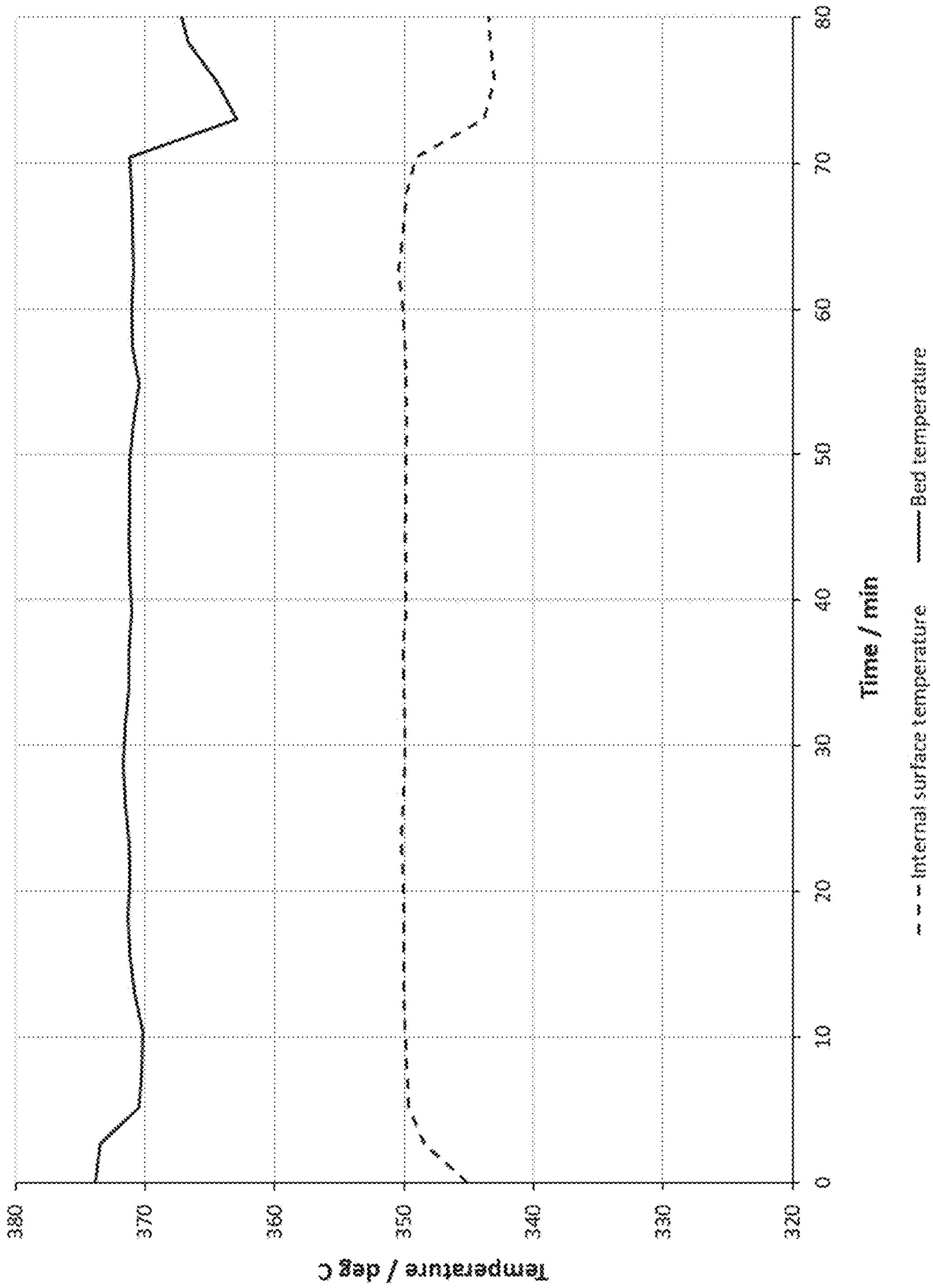
FIG. 8 is a graph showing the representative temperature of the internal surfaces of the reaction zone and the temperature within the plurality of particles during one cycle of silicon deposition of the process shown in FIG. 7.

FIG. 8 shows the representative temperature of the internal surfaces of the reaction zone and the temperature within the plurality of particles during one cycle of silicon deposition in this example.

It is observed that the temperature within the plurality of particles exceeded the temperature of the internal surfaces of the reaction zone at most times during contacting of the gas comprising a silicon-containing precursor with the porous particles. In comparison to the deposition conditions shown in FIGS. 1-6, when the temperature of the internal surfaces of the reaction zone exceeded the temperature within the plurality of particles in FIGS. 7 and 8, the difference in temperature of the internal surfaces of the reaction zone and the temperature within the plurality of particles at any given time was much smaller. Under these conditions, the reaction zone was not soiled. This process is likely to be able to operate for extended periods without needing to perform shutdown and cleaning of the reaction zone.

Example 5

Silicon-carbon composite particles were prepared by placing porous carbon particles inside a stainless steel autoclave with an agitator and gas inlet and outlet lines. The autoclave was purged with nitrogen gas, and then the furnace temperature was set to 350° C. After the temperature of the particle bed reached 350° C., the monosilane was added to the autoclave. After one hour, the autoclave was slowly depressurised. The autoclave was then refilled with monosilane and held for a further hour. Depressurising and refilling were each repeated. After 25 hours, the furnace was switched off and left under an inert nitrogen atmosphere. Approximately 8 hours later, the furnace temperature was set to 350° C. After the temperature of the particle bed reached 350° C., monosilane was added to the autoclave and the steps of depressurising and refilling were each repeated as many times as required for the target silicon content. After dosing had finished, the autoclave was purged using nitrogen and exposed to gradually increasing concentrations of oxygen in order to passivate the composite particles before being cooled down to room temperature.

Figure 9:
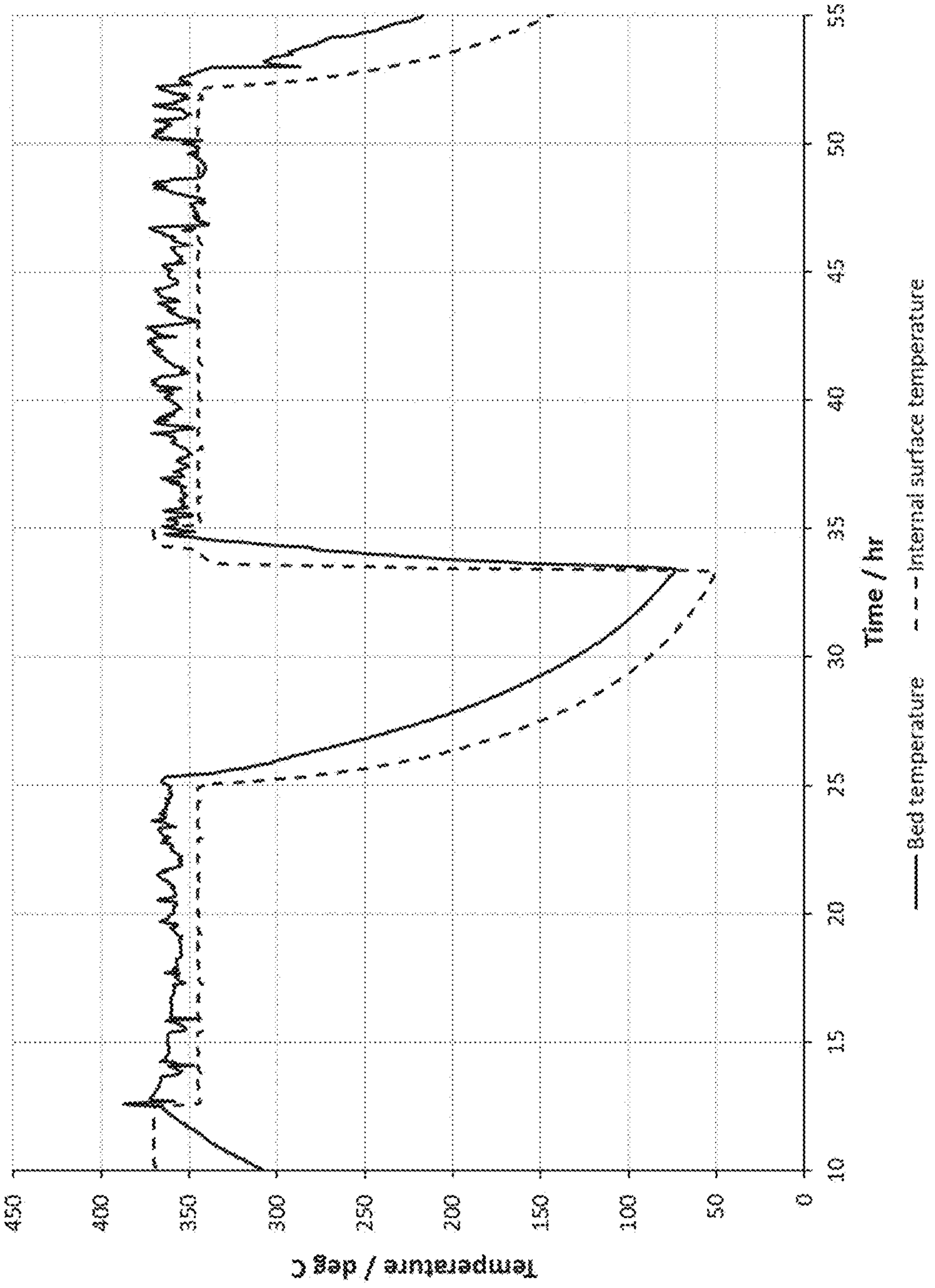
FIG. 9 is a graph showing the representative temperature of the internal surfaces of the reaction zone and the temperature within the plurality of particles of a process according to the invention.

FIG. 9 shows the representative temperature of the internal surfaces of the reaction zone and the temperature within the plurality of particles in this example.

Figure 10:
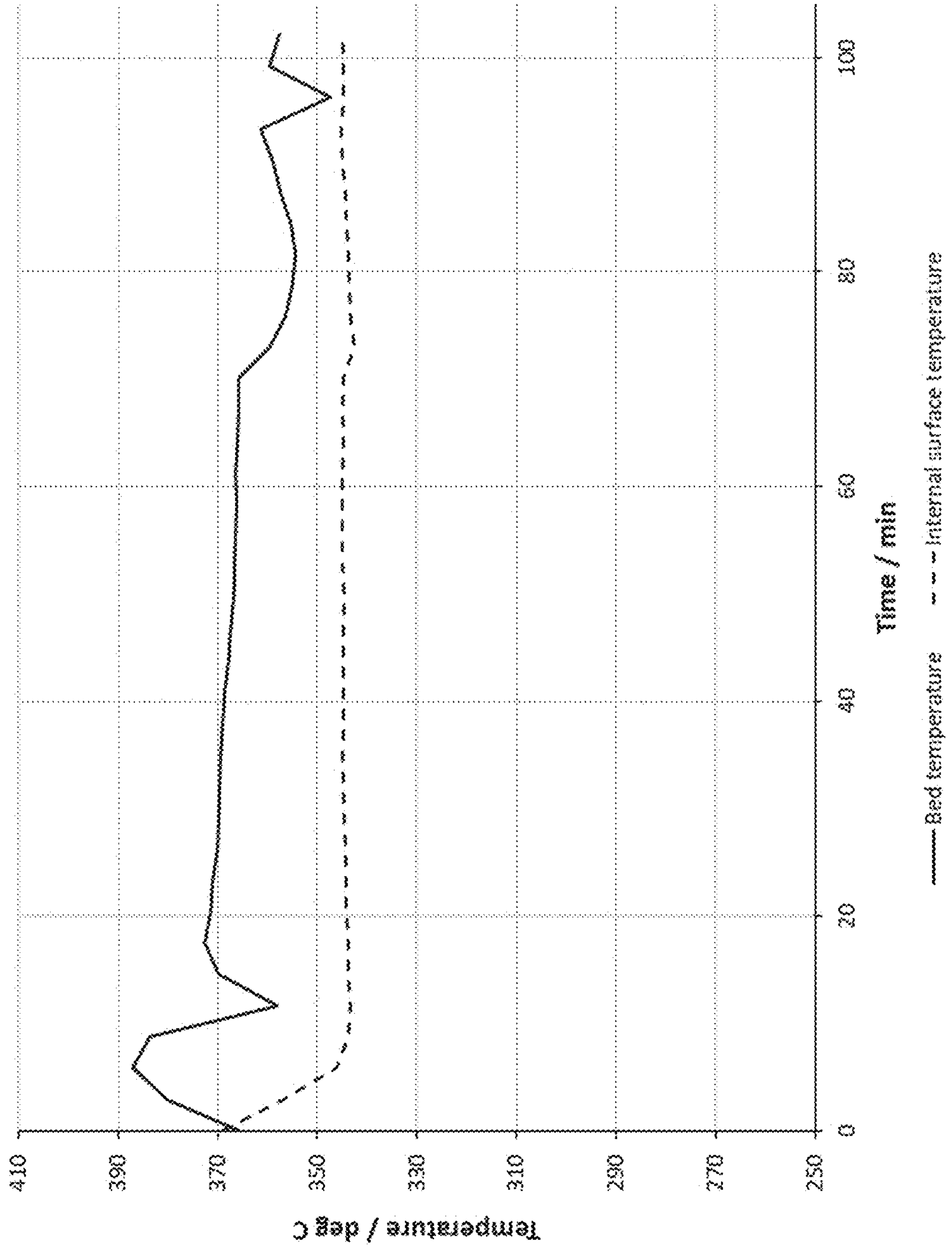
FIG. 10 is a graph showing the representative temperature of the internal surfaces of the reaction zone and the temperature within the plurality of particles during one cycle of silicon deposition of the process shown in FIG. 9.

FIG. 10 shows the representative temperature of the heat source of the reaction zone and the temperature within the plurality of particles during one cycle of silicon deposition in this example.

It is observed that the temperature within the plurality of particles exceeded the temperature of the internal surfaces of the reaction zone at most times during contacting of the gas comprising a silicon-containing precursor with the porous particles. In comparison to the deposition conditions shown in FIGS. 1-6, when the temperature of the internal surfaces of the reaction zone exceeded the temperature within the plurality of particles in FIGS. 9 and 10, the difference in temperature of the internal surfaces of the reaction zone and the temperature within the plurality of particles at any given time was much smaller. Under these conditions, the reaction zone was not soiled. This process is likely to be able to operate for extended periods without needing to perform shutdown and cleaning of the reaction zone.

Example 6

Silicon-carbon composite particles were prepared by placing porous carbon particles inside a stainless steel autoclave with an agitator and gas inlet and outlet lines. The autoclave was purged with nitrogen gas, and then the furnace temperature was set to 395° C. After the temperature of the particle bed reached 395° C., monosilane was continuously added to the autoclave. After dosing had finished, the autoclave was purged using nitrogen and exposed to gradually increasing concentrations of oxygen in order to passivate the composite particles before being cooled down to room temperature.

Figure 11:
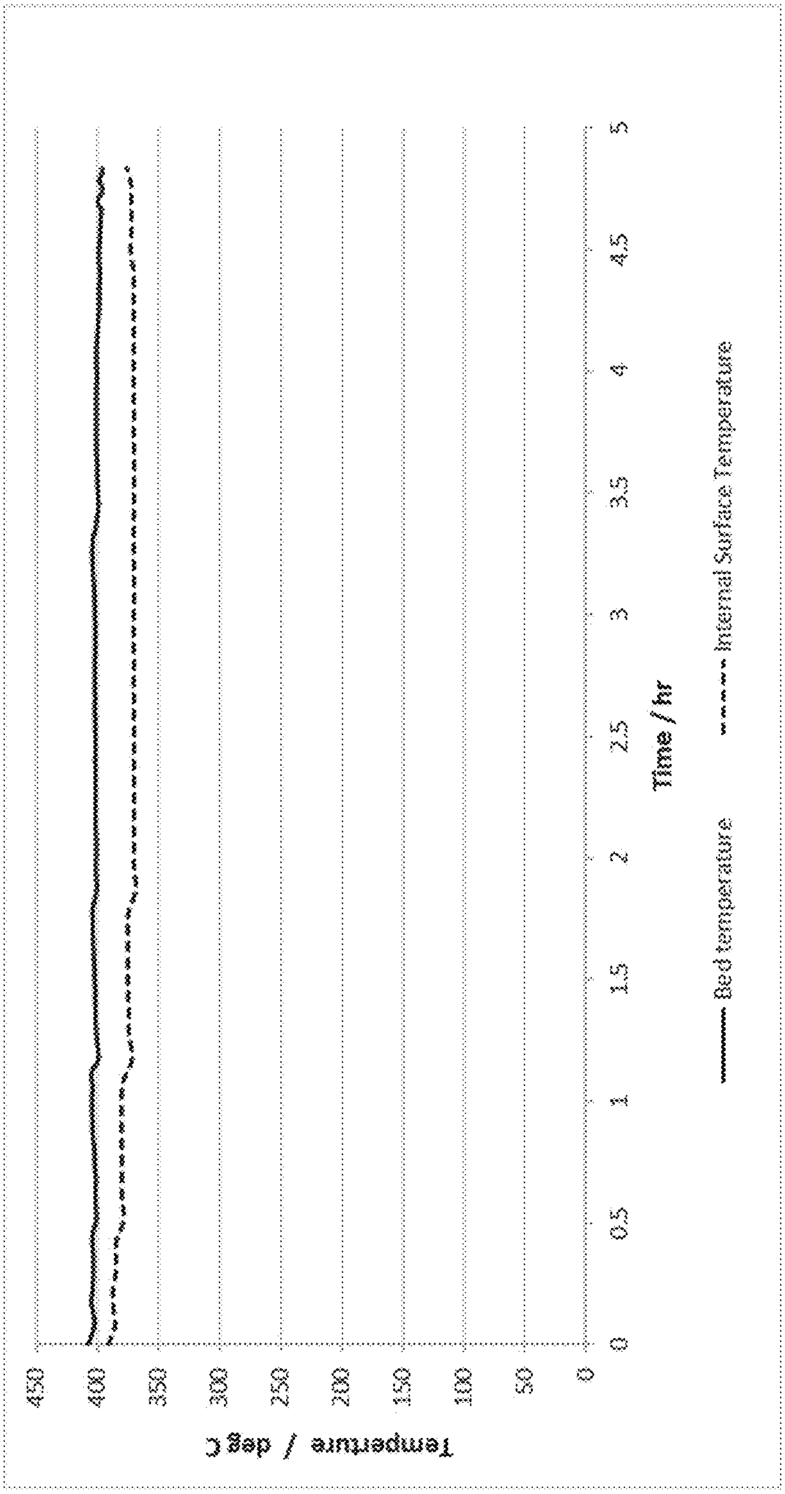
FIG. 11 is a graph showing the representative temperature of the internal surfaces of the reaction zone and the temperature within the plurality of particles of a process according to the invention.

FIG. 11 shows the representative temperature of the internal surfaces of the reaction zone and the temperature within the plurality of particles in this example during the period that monosilane was being continuously added to the autoclave.

It is observed that the temperature within the plurality of particles exceeded the temperature of the internal surfaces of the reaction zone during contacting of the gas comprising a silicon-containing precursor with the porous particles. Under these conditions, the reaction zone was not soiled. This process is likely to be able to operate for extended periods without needing to perform shutdown and cleaning of the reaction zone.

The table below summarises the maximum of (the maximum temperature of the internal surfaces of the reaction zone at a given time less the minimum temperature within the plurality of particles at the same time), throughout the reaction, for each of the examples described above. The table also explains the extent to which the reactor became soiled.

| Example | Maximum ΔT | Was reactor soiled? |
|---|---|---|
| Example 1 | +154.27 | Yes, outside of tolerance |
| Example 2 | +100.98 | Yes, outside of tolerance |
| Example 3 | +79.59 | Yes, but within tolerance |
| Example 4 | +5.019 | No |
| Example 5 | +4.758 | No |
| Example 6 | −17 | No |

The invention claimed is:

1. A process for preparing composite particles, the process comprising the steps of:

(a) providing a plurality of porous particles in a reaction zone, the reaction zone having internal surfaces; and (b) contacting the plurality of particles in the reaction zone with a gas comprising at least 25 vol % of a silicon-containing precursor at a temperature effective to cause deposition of silicon in the pores of the porous particles;

wherein ΔT≤+90° C. is maintained during step (b), wherein ΔT represents the temperature differential between the maximum temperature of the internal surfaces of the reaction zone and the simultaneous minimum temperature within the plurality of porous particles, wherein a positive value of ΔT indicates that the maximum temperature of the internal surfaces of the reaction zone is higher than the minimum temperature within the plurality of particles; and wherein step (b) comprises continuously agitating the porous particles during said contacting.

2. The process according to claim 1, wherein the ΔT maintained during step (b) is in the range from +90° C. to −110° C., or from +85° C. to −110° C., or from +80° C. to −110° C., or from +75° C. to −110° C., or from +70° C. to −110° C., or from +65° C. to −110° C., or from +60° C. to −110° C., or from +55° C. to −110° C., or from +50° C. to −110° C., or from +45° C. to −110° C., or from +40° C. to −110° C., or from +35° C. to −110° C., or from +30° C. to −110° C., or from +25° C. to −110° C., or from +20° C. to −110° C., or from +15° C. to −110° C., or from +10° C. to −110° C., or from +5° C. to −110° C., or from 0° C. to −110° C., or from −5° C. to −110° C., or from −5° C. to −105° C., or from −5° C. to −100° C., or from −5° C. to −95° C., or from −5° C. to −90° C., or from −5° C. to −85° C., or from −5° C. to −80° C., or from −5° C. to −75° C., or from −5° C. to −70° C., or from −5° C. to −65° C., or from −5° C. to −60° C., or from −5° C. to −55° C., or from −5° C. to −50° C., or from −5° C. to −45° C., or from −5° C. to −40° C., or from −5° C. to −35° C., or from −5° C. to −30° C., or from −5° C. to −25° C., or from −5° C. to −20° C., or from −5° C. to −15° C., or from −5° C. to −10° C.

3. A process for preparing composite particles, the process comprising the steps of:

(a) providing a plurality of porous particles in a reaction zone, the reaction zone having internal surfaces; and (b) contacting the plurality of particles in the reaction zone with a gas comprising at least 25 vol % of a silicon-containing precursor at a temperature effective to cause deposition of silicon in the pores of the porous particles;

wherein $\Delta T \leq +40°$ C. is maintained during step (b), wherein $\Delta T$ represents the temperature differential between the maximum temperature of the internal surfaces of the reaction zone and the simultaneous minimum temperature within the plurality of porous particles, wherein a positive value of $\Delta T$ indicates that the maximum temperature of the internal surfaces of the reaction zone is higher than the minimum temperature within the plurality of particles; and wherein the minimum temperature within the plurality of porous particles during said contacting in step (b) is in the range from 360 to 395° C.

4. The process according to claim 1, wherein step (a) comprises preheating the plurality of porous particles before providing the plurality of porous particles in the reaction zone, preferably wherein the plurality of porous particles are preheated to a temperature of from 300 to 480° C., or from 320 to 450° C., or from 330 to 400° C., or from 340 to 390° C., or from 345 to 390° C., or from 350 to 400° C., or from 350 to 390° C., or from 350 to 385° C., or from 350 to 380° C., or from 355 to 390° C., or from 355 to 385° C., or from 355 to 380° C., or from 360 to 390° C., or from 360 to 385° C., or from 360 to 380° C.

5. The process according to claim 1, wherein step (a) comprises providing a batch of the plurality of porous particles in the reaction zone.

6. The process according to claim 1, wherein the maximum temperature of the internal surfaces of the reaction zone during said contacting in steps (b) is from 150 to 480° C., or from 150 to 460° C., or from 150 to 440° C., or from 150 to 420° C., or from 150 to 400° C., or from 150 to 390° C., or from 200 to 390° C., or from 250 to 390° C., or from 300 to 390° C., or from 340 to 375° C., or from 340 to 370° C., or from 345 to 370° C., or from 345 to 365° C., or from 350 to 400° C., or from 350 to 390° C., or from 350 to 380° C., or from 350 to 370° C., or from 350 to 365° C.

7. The process according to claim 1, wherein step (b) comprises continuously introducing the gas comprising the silicon-containing precursor into the reaction zone.

8. The process according to claim 1, wherein step (b) comprises mechanically continuously agitating the porous particles during said contacting, preferably wherein the reaction zone comprises an agitator for continuously agitating the porous particles during said contacting, preferably wherein said agitating is carried out by a high shear mixer.

9. The process according to claim 1, wherein the plurality of porous particles in the reaction zone in step (a) has a volume of at least 100 $cm^3$ per litre of reaction zone ($cm^3/L_{RV}$), or at least 150 $cm^3/L_{RV}$, or at least 200 $cm^3/L_{RV}$, or at least 250 $cm^3/L_{RV}$, or at least 300 $cm^3/L_{RV}$, or at least 400 $cm^3/L_{RV}$, or at least 500 $cm^3/L_{RV}$, or at least 600 $cm^3/L_{RV}$, or at least 700 $cm^3/L_{RV}$, or at least 800 $cm^3/L_{RV}$, or at least 900 $cm^3/L_{RV}$.

10. The process according to claim 1, wherein the silicon-containing precursor is selected from the group consisting of silane ($SiH_4$), disilane ($Si_2H_6$), trisilane ($Si_3H_8$), tetrasilane ($Si_4H_{10}$), methylsilane, dimethylsilane and chlorosilanes, and mixtures thereof.

11. The process according to claim 1, wherein the pressure in step (b) is from 10 to 15000 kPa, or from 50 to 10000 kPa, or from 120 to 5000 kPa, or from 150 to 2000 kPa, or from 200 to 1800 kPa, or from 200 to 1600 kPa, or from 250 to 1500 kPa, or from 300 to 1200 kPa, or from 400 to 1000 kPa, or from 500 to 900 kPa, or from 600 to 800 kPa.

12. The process according to claim 1, wherein the gas comprising the silicon-containing precursor comprises at least 30 vol % of silicon-containing precursor based on the total volume of the gas, or at least 40 vol %, or at least 50 vol %, or at least 60 vol %, or at least 70 vol %, or at least 80 vol %, or at least 90 vol %, or at least 95 vol %, or at least 97 vol %, or at least 99 vol % of silicon-containing precursor based on the total volume of the gas.

13. The process according to claim 1, wherein:

(i) the plurality of porous particles have a BET surface area in the range from 1,000 $m^2/g$ to 3,000 $m^2/g$, (ii) $\Delta T$ in step (b) is $\leq +20°$ C.

(iii) the plurality of porous particles is maintained within a temperature range from 370 to 395° C. during step (b);

(iv) the ratio of the internal surface area of the reaction zone to mass of porous particles in the reaction zone in step (a) is no more than 0.4 $m^2/kg$; and (v) step (b) comprises continuously agitating the porous particles.

14. The process according to claim 1, wherein the process further comprises the step of:

forming a passivation layer on the surface of the silicon deposited in step (b) by contacting the particles from step (b) with a passivating agent.

15. The process according to claim 1, wherein the process further comprises the step of:

contacting the particles from step (b) with a carbon-containing precursor at a temperature effective to cause deposition of a pyrolytic carbon material in the pores of the particles.

16. The process according to claim 3, wherein step (a) comprises preheating the plurality of porous particles before providing the plurality of porous particles in the reaction zone, preferably wherein the plurality of porous particles are preheated to a temperature of from 300 to 480° C., or from 320 to 450° C., or from 330 to 400° C., or from 340 to 390° C., or from 345 to 390° C., or from 350 to 400° C., or from 350 to 390° C., or from 350 to 385° C., or from 350 to 380° C., or from 355 to 390° C., or from 355 to 385° C., or from 355 to 380° C., or from 360 to 390° C., or from 360 to 385° C., or from 360 to 380° C.

17. The process according to claim 3, wherein step (a) comprises providing a batch of the plurality of porous particles in the reaction zone.

18. The process according to claim 3, wherein step (b) comprises continuously introducing the gas comprising the silicon-containing precursor into the reaction zone.

19. The process according to claim 3, wherein the plurality of porous particles in the reaction zone in step (a) has a volume of at least 100 $cm^3$ per litre of reaction zone ($cm^3/L_{RV}$), or at least 150 $cm^3/L_{RV}$, or at least 200 $cm^3/L_{RV}$, or at least 250 $cm^3/L_{RV}$, or at least 300 $cm^3/L_{RV}$, or at least 400 $cm^3/L_{RV}$, or at least 500 $cm^3/L_{RV}$, or at least 600 $cm^3/L_{RV}$, or at least 700 $cm^3/L_{RV}$, or at least 800 $cm^3/L_{RV}$, or at least 900 $cm^3/L_{RV}$.

20. The process according to claim 3, wherein the silicon-containing precursor is selected from the group consisting of silane ($SiH_4$), disilane ($Si_2H_6$), trisilane ($Si_3H_8$), tetrasilane ($Si_4H_{10}$), methylsilane, dimethylsilane and chlorosilanes, and mixtures thereof.

21. The process according to claim 3, wherein the pressure in step (b) is from 10 to 15000 kPa, or from 50 to 10000 kPa, or from 120 to 5000 kPa, or from 150 to 2000 kPa, or from 200 to 1800 kPa, or from 200 to 1600 kPa, or from 250 to 1500 kPa, or from 300 to 1200 kPa, or from 400 to 1000 kPa, or from 500 to 900 kPa, or from 600 to 800 kPa.

22. The process according to claim 3, wherein the gas comprising the silicon-containing precursor comprises at least 30 vol % of silicon-containing precursor based on the total volume of the gas, or at least 40 vol %, or at least 50 vol %, or at least 60 vol %, or at least 70 vol %, or at least 80 vol %, or at least 90 vol %, or at least 95 vol %, or at least 97 vol %, or at least 99 vol % of silicon-containing precursor based on the total volume of the gas.

23. The process according to claim 2, wherein:

(i) the plurality of porous particles have a BET surface area in the range from 1,000 $m^2/g$ to 3,000 $m^2/g$, (ii) $\Delta T$ in step (b) is ≤+20° C.

(iii) the plurality of porous particles is maintained within a temperature range from 370 to 395° C. during step (b);

(iv) the ratio of the internal surface area of the reaction zone to mass of porous particles in the reaction zone in step (a) is no more than 0.4 $m^2/kg$; and (v) step (b) comprises continuously agitating the porous particles.

24. The process according to claim 3, wherein the process further comprises the step of:

forming a passivation layer on the surface of the silicon deposited in step (b) by contacting the particles from step (b) with a passivating agent.

25. The process according to claim 3, wherein the process further comprises the step of:

contacting the particles from step (b) with a carbon-containing precursor at a temperature effective to cause deposition of a pyrolytic carbon material in the pores of the particles.

* * * * *